US007194575B2

(12) United States Patent
Nakanishi et al.

(10) Patent No.: US 7,194,575 B2
(45) Date of Patent: Mar. 20, 2007

(54) AUTOMATIC DISK MIRRORING ACCORDING TO WORKLOAD

(75) Inventors: Yoshifumi Nakanishi, Yokohama (JP); Nobuo Kawamura, Atsugi (JP); Takashi Itaya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 10/909,511

(22) Filed: Aug. 3, 2004

(65) Prior Publication Data

US 2005/0262317 A1 Nov. 24, 2005

(30) Foreign Application Priority Data

May 24, 2004 (JP) ............... 2004-152730

(51) Int. Cl.
*G06F 5/06* (2006.01)
*G06F 9/46* (2006.01)

(52) U.S. Cl. ..................... 711/112; 718/105
(58) Field of Classification Search ............. 707/2, 707/10; 711/100, 112, 114, 154, 161–162; 718/105
See application file for complete search history.

(56) References Cited

U.S. PATENT DOCUMENTS

| 6,487,638 | B2 |   | 11/2002 | Dawkins et al. |
| 8,557,035 |    | * | 4/2003  | McKnight ............. 709/224 |
| 6,694,413 | B1 | * | 2/2004  | Mimatsu et al. ......... 711/162 |
| 6,757,753 | B1 |   | 6/2004  | DeKoning et al. |
| 6,779,078 | B2 |   | 8/2004  | Murotani et al. |
| 6,961,727 | B2 | * | 11/2005 | McBrearty et al. ........ 707/10 |
| 2003/0055943 | A1 | * | 3/2003 | Kanai ................. 709/223 |
| 2004/0015658 | A1 |   | 1/2004 | Kitamura |
| 2004/0098423 | A1 | * | 5/2004 | Chigusa et al. ........... 707/204 |
| 2004/0123180 | A1 | * | 6/2004 | Soejima et al. ............ 714/5 |
| 2004/0133707 | A1 | * | 7/2004 | Yoshiya et al. ............ 710/6 |
| 2004/0260514 | A1 | * | 12/2004 | Beaudoin et al. ......... 702/182 |
| 2005/0114624 | A1 |   | 5/2005 | Cervantes et al. |
| 2005/0240637 | A1 | * | 10/2005 | Kawamura ............. 707/204 |

FOREIGN PATENT DOCUMENTS

| JP | 10214129 A | * | 8/1998 |
| JP | 11-149350  |   | 6/1999 |
| JP | 11149350   |   | 6/1999 |

OTHER PUBLICATIONS

Chen, Ming-Syan, et al., Using Rotational Mirrored Declustering for Replica Placement in a Disk-Array-Based Video Server, ACM.*

* cited by examiner

*Primary Examiner*—Sanjiv Shah
*Assistant Examiner*—James R. Golden
(74) *Attorney, Agent, or Firm*—Antonelli, Terry, Stout and Kraus, LLP.

(57) ABSTRACT

A disk volume access controlling method includes the steps of setting a threshold number of times of accesses from a computer to a predetermined disk volume per time unit, acquiring a number of times of accesses to the predetermined disk volume per time unit, seeking whether or not the number of times of accesses acquired exceeds the threshold number of times, creating a mirror volume for the predetermined disk volume in case that the number of times of accesses acquired exceeds the threshold number of times, and changing an access pass between the computer and the predetermined disk volume to another access pass between the computer and the newly created mirror volume. It then becomes possible to distribute accesses to a certain disk volume, and further to make the accesses to a plurality of volumes even.

3 Claims, 20 Drawing Sheets

FIG.4

| VOLUME NAME | UPPER LIMIT VALUE [TIMES/MIN] |
|---|---|
| LOGICAL VOLUME P | 1000 |
|  |  |
|  |  |

FIG.5

| PROGRAM NAME | ACCESS REQUESTED VOLUME NAME | ACCESSED VOLUME NAME |
|---|---|---|
| SERVICE PROGRAM A | LOGICAL VOLUME P | LOGICAL VOLUME P |
| SERVICE PROGRAM B | LOGICAL VOLUME P | LOGICAL VOLUME P |
| SERVICE PROGRAM C | LOGICAL VOLUME P | LOGICAL VOLUME R |
| | | |
| | | |

FIG.11

| VOLUME NAME | TIME PERIOD | NUMBER OF DATA | UPPER LIMIT VALUE [TIMES/MIN] |
|---|---|---|---|
| LOGICAL VOLUME P | 10 | 8 | 1000 |
| | | | |
| | | | |
| | | | |

FIG.16

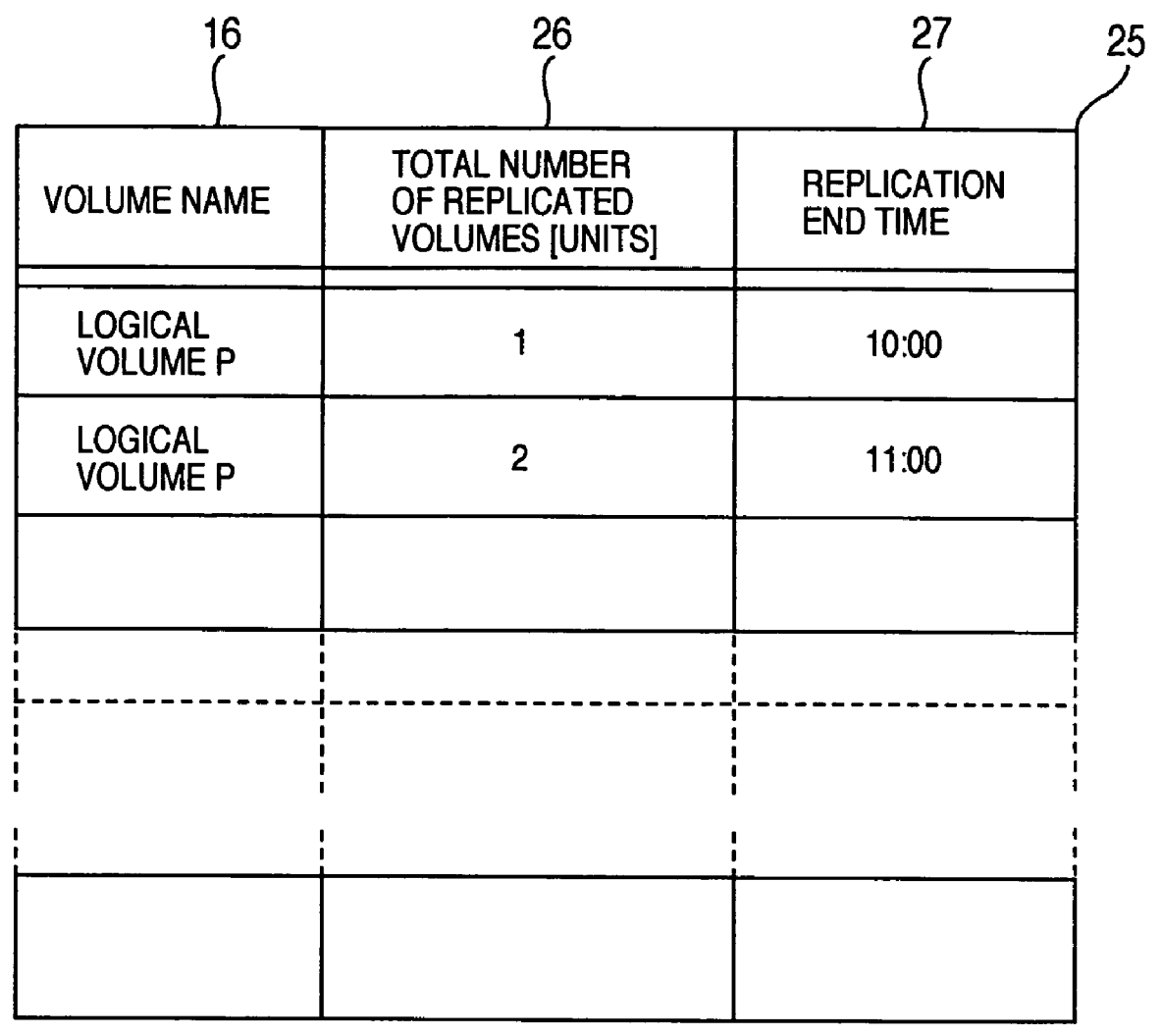

| VOLUME NAME | TOTAL NUMBER OF REPLICATED VOLUMES [UNITS] | REPLICATION END TIME |
|---|---|---|
| LOGICAL VOLUME P | 1 | 10:00 |
| LOGICAL VOLUME P | 2 | 11:00 |
| | | |
| | | |

…

AUTOMATIC DISK MIRRORING ACCORDING TO WORKLOAD

INCORPORATION BY REFERENCE

The present application claims priority from Japanese application JP2004-152730 filed on May 24, 2004, the content of which is hereby incorporated by reference into this application.

BACKGROUND OF THE INVENTION

The present invention relates to disk access control techniques which are intended to distribute a load associated with disk accesses when a plurality of service programs are to access a disk storage device.

JP-A-11-149350 discloses techniques related to a distribution of a disk access load caused by a plurality of read requests made to a disk storage device.

Specifically, JP-A-11-149350 discloses a disk storage system which comprises a controller having a plurality of external connection pointers, a storage device group comprised of a plurality of storage devices such that write data is written into each of the storage devices, and a plurality of paths connected to the storage device group and controller. The controller reads stored data based on a first read request and a second read request issued from a processor to the storage device group from any of the storage devices in the group which is left empty, and transfers read data to the processor through an external connection point, thereby successfully distributing input/output processing between the processor and disk device group to improve the parallel input/output processing executable by the controller.

SUMMARY OF THE INVENTION

It is preferable for a method of controlling accesses to the disk storage devices not to involve manually replicating predetermined volumes beforehand for distributing a disk access load through the replication. It then is unnecessary for a user to be required to execute the processing involved in the replication of disks when the disk access load suddenly fluctuates or when no increase was predicted in the disk access load. Thus it becomes possible to make it easy to immediately execute the access control.

It is also preferable for a disk access control method using replicated volumes to effect improvements in terms of dynamic execution of access control.

It is, therefore, an object of the present invention to limit the number of accesses predetermined volume in a disk storage device per unit time to a certain value without the need for previous manual replication of volumes or modifications to a program. Specifically, a particular monitoring unit detects that the number of accesses to a volume per unit time exceeds an upper limit value, and requests a controller of the disk storage device to replicate the volume, such that a management program for the disk storage device distributes accesses to the original volume and replicated volume.

The object of the present invention is achieved by a system which includes a disk storage device having a volume replication function in a SAN (Storage Area Network), a computer A for executing a program which accesses the disk storage device, and a management computer B for executing a management program B for managing the disk storage device.

To achieve the object, the following steps are executed:

(1) setting an upper limit value for the number of accesses per unit time;

(2) monitoring disk accesses by a particular monitoring unit;

(3) requesting replication of a predetermined volume, and replicating the volume; and (4) switching an access path.

Items set in (1) are classified into three patterns by conditions under which a replication request is made from a disk access situation at a current time. The conditions for making the replication request are listed below:

(a) when the number of accesses to a predetermined volume per unit time at the current time exceeds the upper limit value;

(b) when a predicted number of accesses in T minutes later from the current time exceeds the upper limit value; and (c) when the current time matches with the value calculated by subtracting a time required for replication from a previously set replication time in a replication management schedule which indicates the number of replicas of a predetermined volume over time.

Items set in case (a) include a predetermined volume, and the number of accesses to the volume per unit time, wherein an upper limit value management table is created from the set items at step (1).

Items set in case (b) include a time period T between a time at which a predicted number of accesses per unit time is calculated and the current time, and the number of data N used for calculating the predicted number of accesses per unit time in addition to a predetermined volume, and the number of accesses to the volume per unit time. Similar to-case (a), the upper limit value management table is created from the set items at step (1).

In case (c), a replication management table is created at step (1) for indicating the number of replicas at a time at which a volume is replicated or a replicated volume is deleted. Next, at step (2), three patterns are available depending on where disk accesses are monitored.

Components responsible for the monitoring of disk accesses are listed below.

(d) a processing program on the computer A;

(e) the controller of the disk storage device; and (f) a management program B on the management computer B for managing the disk storage device.

Any of the components (d)–(f) monitors disk accesses, and the same component as that responsible for the monitoring of disk accesses manages the upper limit value management table created from the items set at step (1), and the replication management table.

In case (d), disk accesses to a predetermined volume is monitored by acquiring the number of accesses per unit time from an access monitoring unit of a management program A on the same computer A responsible for the system management.

In case (e), disk accesses to a predetermined volume is monitored by acquiring data from an access monitoring unit in the controller of the disk storage device.

In case (f), disk accesses to a predetermined volume is monitored by acquiring data from an access monitoring unit of the management program B for managing the disk storage device.

At step (3), it is determined whether or not a replication request should be made under any of the conditions (a)–(c) shown at step (1). This determination is made by any of the components (d)–(f) shown at step (2). When the result of the determination indicates that the replication is necessary, a request for replicating the predetermined volume is made to the controller of the disk storage device, so that the controller of the disk storage device responsively replicates the predetermined volume.

At step (4), the completion of the replication of the predetermined volume is followed by an update to the contents of an access destination management table of each program previously contained in the management program B for managing the disk storage device to switch the access path, such that a program additionally attempting to access the original volume is directed to access the replicated volume.

By following the foregoing steps, even if a plurality of programs simultaneously access one and the same volume, the number of accesses to each volume in the disk storage device per unit time is limited to a certain value or less, thus improving the disk access performance.

As described above, according to the present invention, the volume access load can be distributed by creating a replica of the predetermined volume, and distributing accesses to the original volume and replicated volume.

BRIEF DESCRIPTION OF THE DRAWINGS

FIG. 4 shows an upper limit management table used in the first to third embodiments;

FIG. 5 shows an access destination management table;

FIG. 11 shows an upper limit value management table used in the fourth to sixth embodiments;

FIG. 16 shows a replication management table;

DETAILED DESCRIPTION OF THE EMBODIMENTS

In the following, some embodiments of a disk access control method according to the present invention will be described with reference to the accompanying drawings which illustrate such embodiments.

[First Embodiment]

Figure 1:
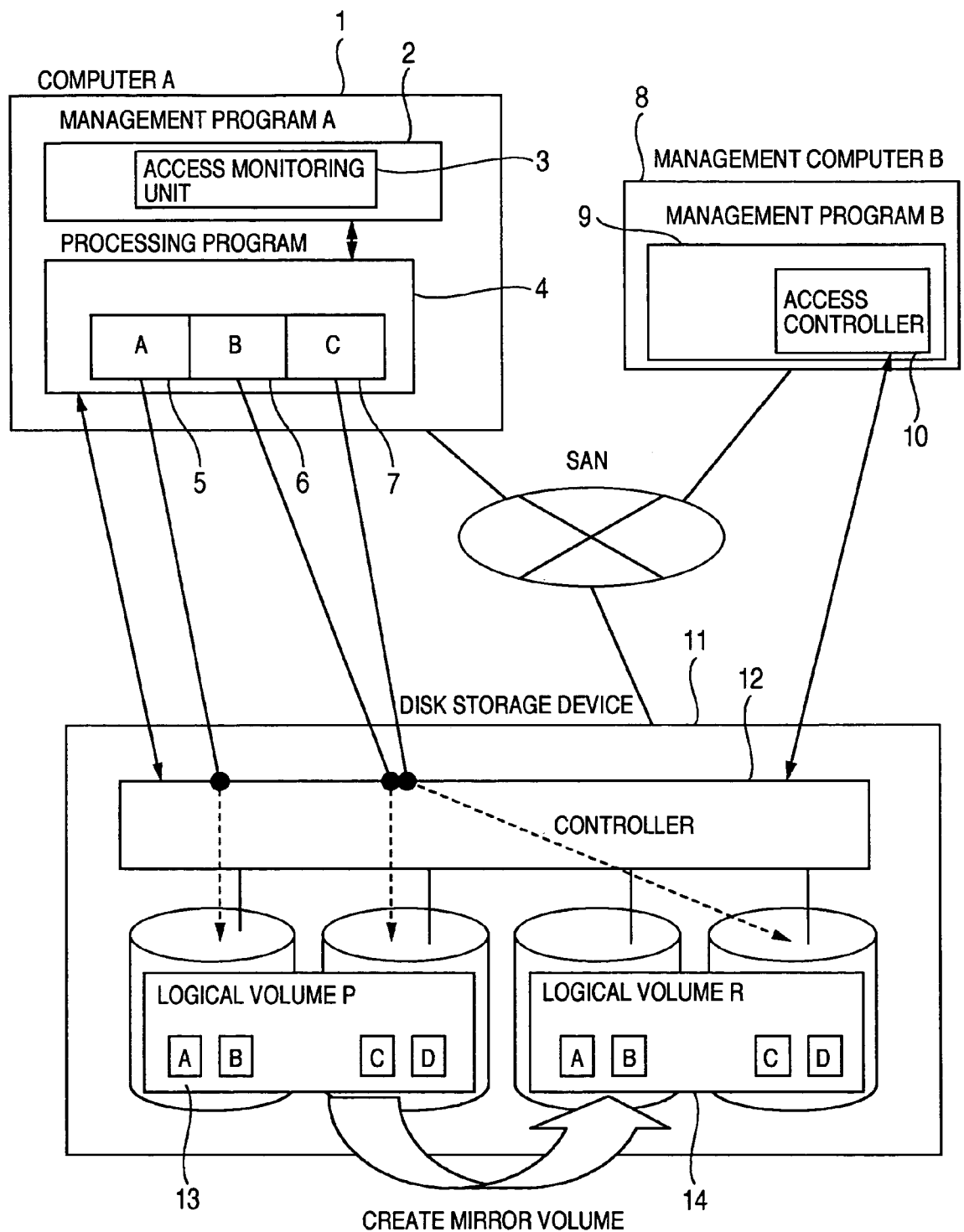
FIG. 1 is a block diagram illustrating the principles of a system according to the present invention.
Figure 2:
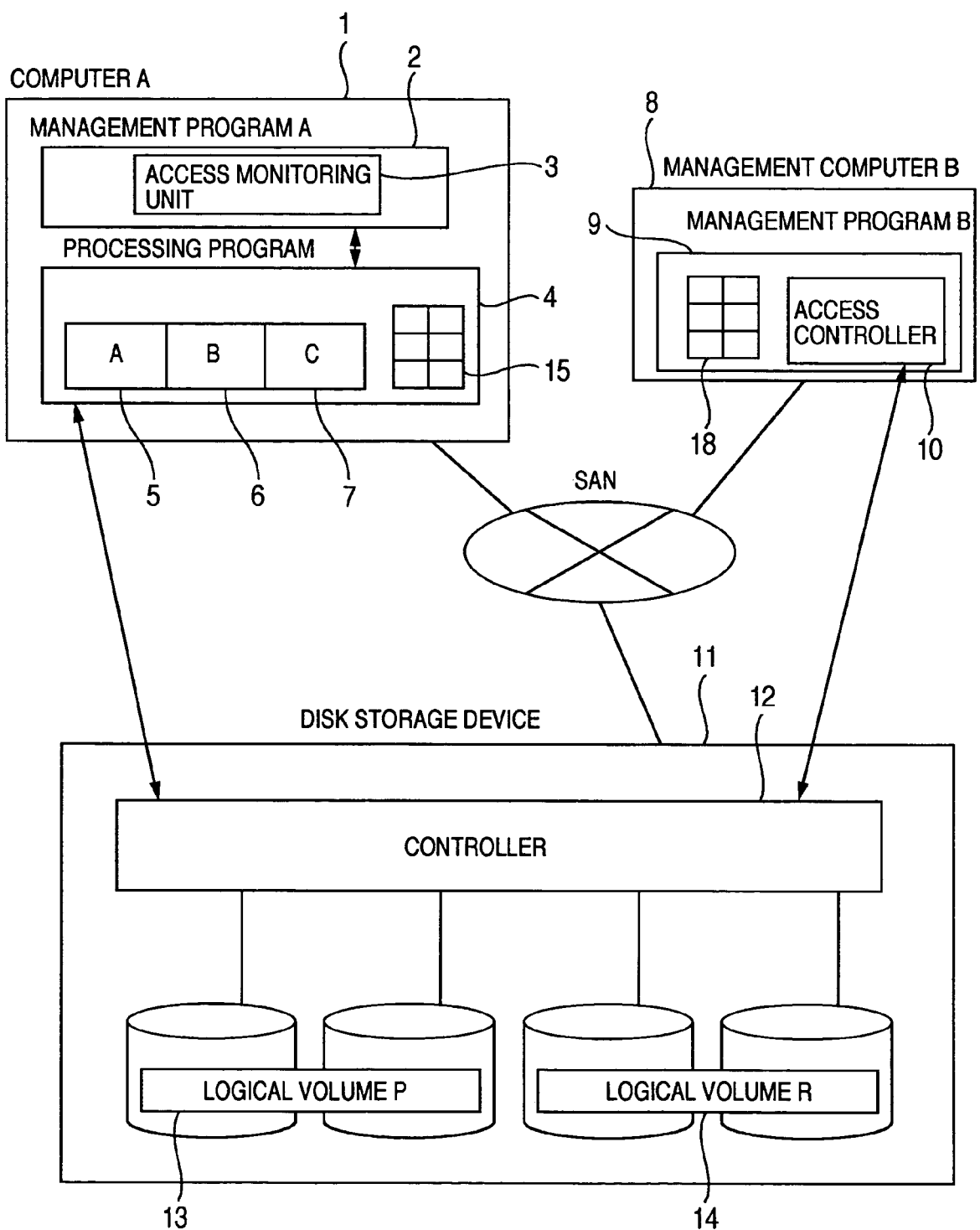
FIG. 2 is a block diagram illustrating the configuration of a system according in a first, a fourth, and a seventh embodiment.
Figure 3:
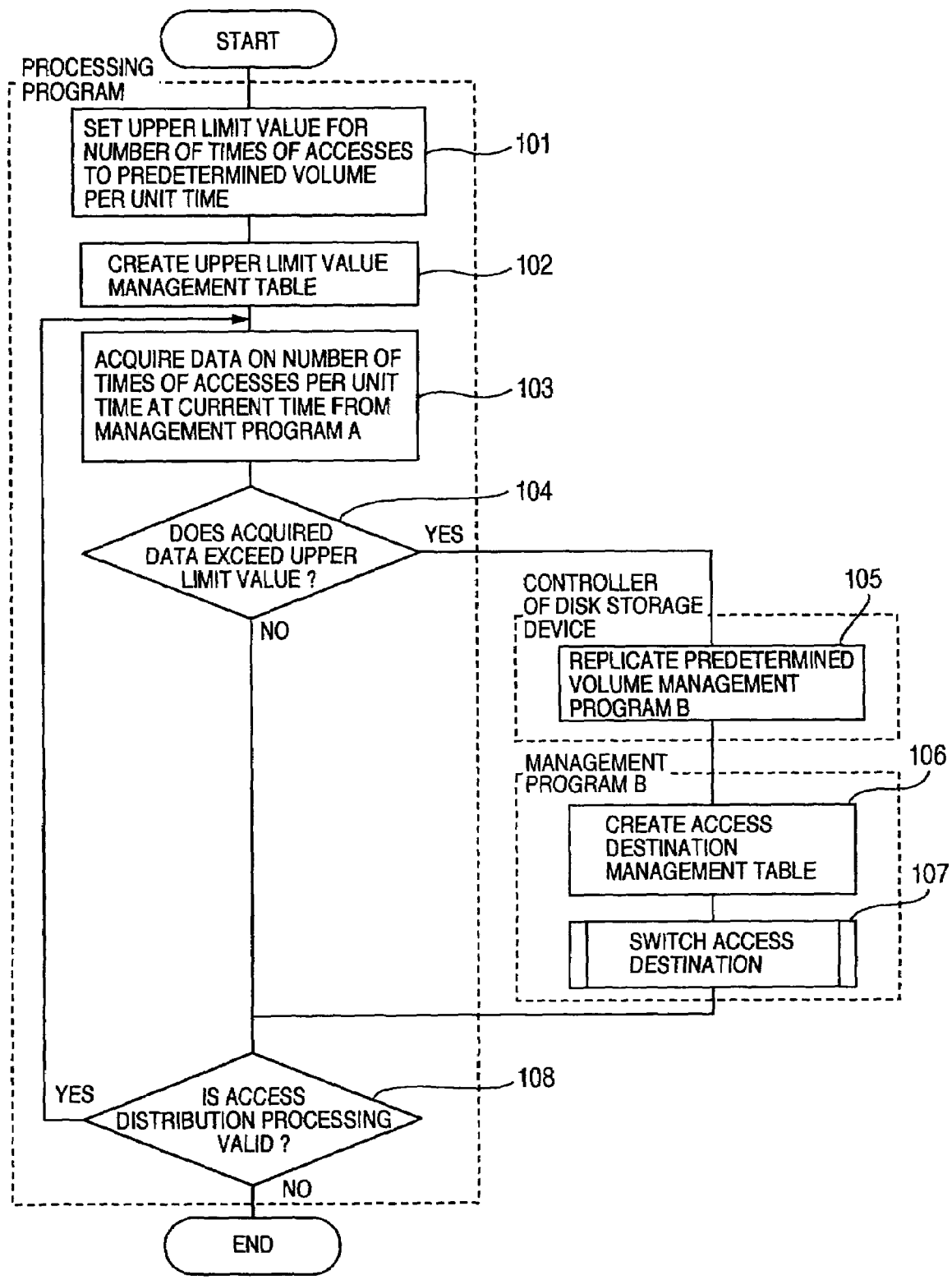
FIG. 3 is a flow chart generally illustrating a sequence of processing steps in the first embodiment.

FIG. 1 shows a conceptual block diagram of a system as a first embodiment according to the present invention, and FIG. 2 is a block diagram illustrating the configuration of a system according to a first embodiment. The illustrated system according to the first embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. FIG. 3 is a flow chart generally illustrating a sequence of processing steps in the first embodiment. The processing flow is outlined below.

At step 101, the processing program 4 receives an upper limit value set by the user for the number of accesses to a predetermined volume per unit time.

At step 102, the processing program 4 creates an upper limit value management table 15.

At step 103, the processing program 4 acquires data on the number of accesses (i.e., number of access occurrences) per unit time at the current time from the management program A 2.

At step 104, the processing program 4 determines whether or not the acquired data exceeds the upper limit value.

At step 105, the controller 12 of the disk storage device 11 replicates the predetermined volume.

At step 106, the management program B 9 creates an access destination management table 18.

At step 107, the management program B 9 switches the volume to be accessed from the original volume to the replicated volume.

At step 108, the processing program 4 determines whether or not the access distribution processing is valid.

Next, detailed description will be made below on the steps in FIG. 3 when the user controls accesses to the logical volume P 13.

At step 101, the user sets an upper limit value for the number of accesses to the logical volume P 13 per unit time for the processing program 4.

At step 102, the processing program 4 creates the upper limit value management table 15 comprised of a volume name 16 and an upper limit value 17, as shown in FIG. 4, sets an upper limit value of 1000 [times/min] for the logical volume P 13, and enters the logical volume P 13 and the set upper limit value into the upper limit value management table 15.

At step 103, the processing program 4 receives data on the number of accesses to the logical volume P 13 per unit time from an access monitoring unit 3 of the management program A 2. Upon receipt of the data, the processing program 4 references the upper limit value management table 15 to retrieve the upper limit value of 1000 [times/min] for the logical volume P 13.

At step 104, the processing program 4 determines whether or not the data acquired from the access monitoring unit 3 of the management program A 2 at step 103 exceeds the upper limit value of 1000 [times/min] retrieved from the upper limit value management table 15 at step 103. When the upper limit value of 1000 [times/min] is not exceeded, the processing flow proceeds to step 108. Conversely, when the upper limit value of 1000 [times/min] is exceeded, the processing flow proceeds to step 105.

At step 105, the processing program 4 requests the controller 12 of the disk storage device 11 to replicate the logical volume P 13. Upon receipt of the replication request, the controller 12 of the disk storage device 11 creates a logical volume R 14 which is a mirror volume of the replication requested volume P 13.

At step 106, after the mirror volume has been completely created at step 105, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of a program name 19, an access requested volume name 20, and an accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 106, the controller 12 enters the names of the access requesting programs, i.e., service programs A 5 and B 6 into the access destination management table 18.

At step 107, when the service program C 7 additionally requests an access to the logical volume P 13 after step 106, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 108, the processing program 4 determines the validity of the access control processing for distributing the accesses to the logical volume P 13. When determined as valid, the processing flow jumps back to step 103. When not determined as valid, the processing flow is terminated.

By executing steps 101 to 108 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Second Embodiment]

Figure 6:
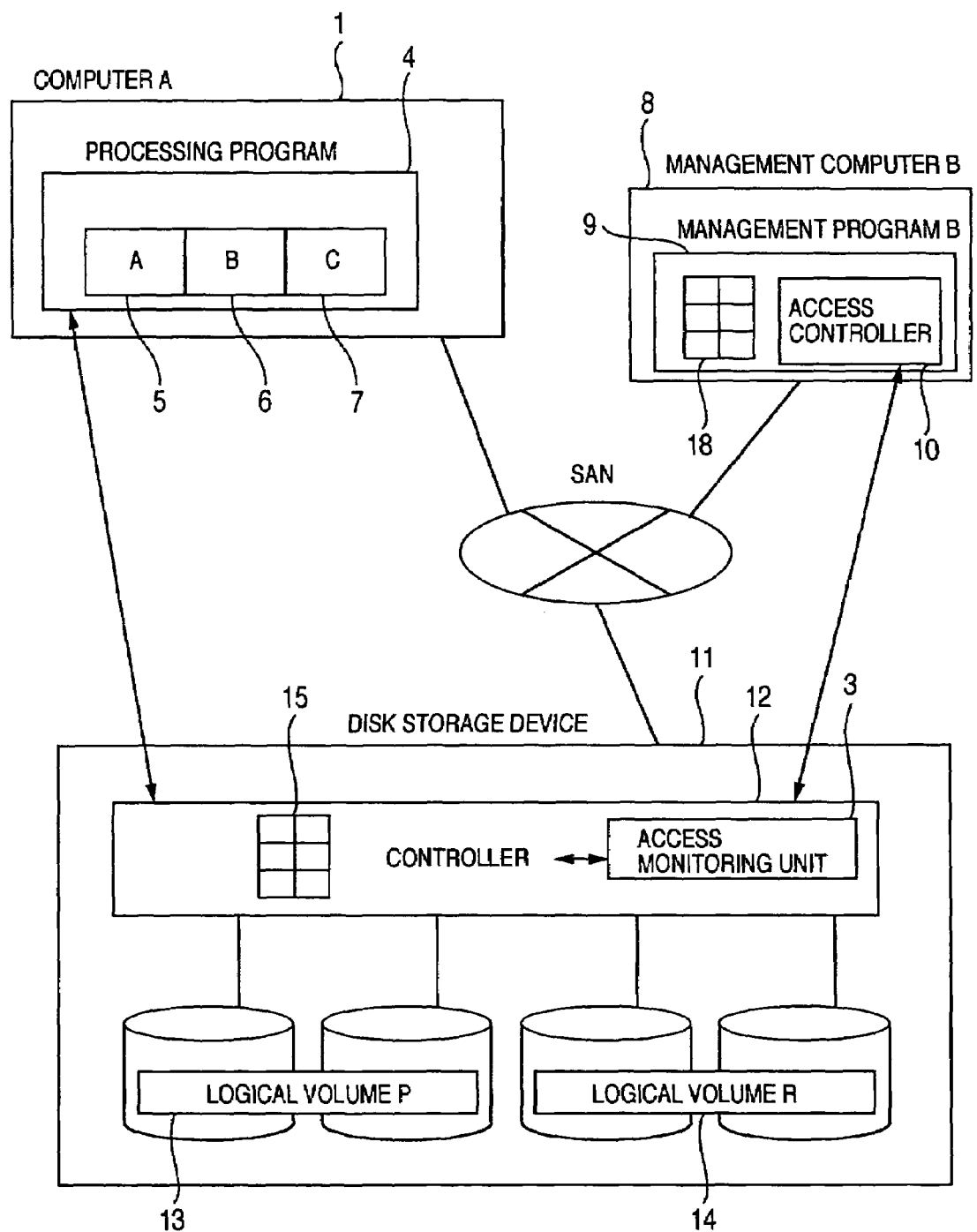
FIG. 6 is a block diagram illustrating the configuration of a system according to a second, a fifth, and an eighth embodiment.
Figure 7:
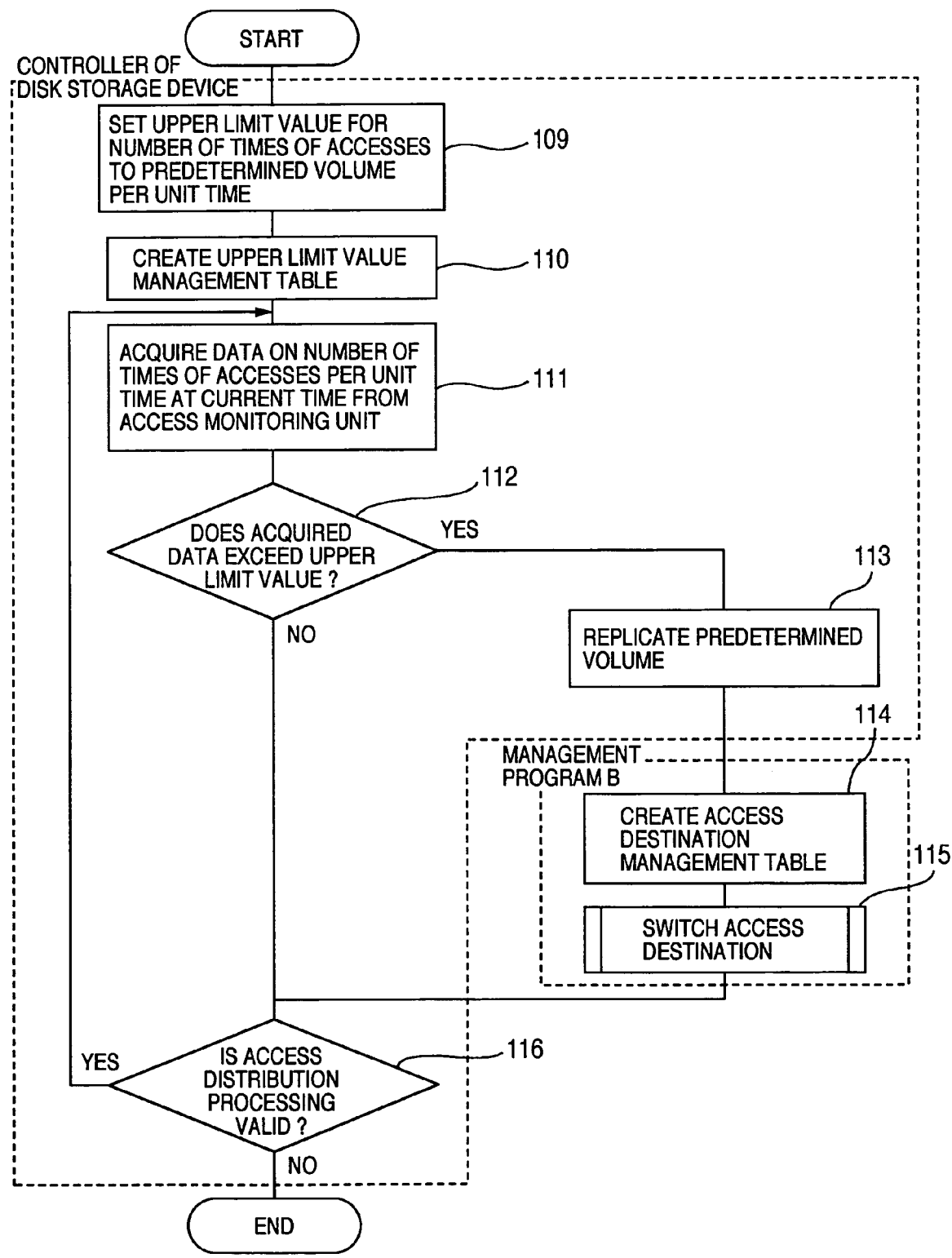
FIG. 7 is a flow chart generally illustrating a sequence of processing steps in the second embodiment.

FIG. 6 is a block diagram illustrating the configuration of a system according to a second embodiment. The illustrated system according to the second embodiment comprises a disk storage device 11 having a volume replication function; a computer A 1 which executes a processing program 4 that accesses the disk storage device 11; and a management computer B 8 which executes a management program B 9 for managing the disk storage device 11. A service program A 5 running on the processing program 4 generates an input/output request to a certain volume in the disk storage device 11, and a controller 12 of the disk storage device 11, upon receipt of the request, performs an input/output operation for the requested volume. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The second embodiment differs from the first embodiment in that the controller 12 of the disk storage device 11 is responsible for the creation of the upper limit value management table 15, the monitoring of the number of accesses, and the comparison of the monitored number of times with the upper limit value. FIG. 7 is a flow chart generally illustrating a sequence of processing steps in the second embodiment. The processing flow is outlined below.

At step 109, the controller 12 of the disk storage device 11 receives an upper limit value set by the user for the number of accesses to a predetermined volume per unit time.

At step 110, the controller 12 of the disk storage device 11 creates the upper limit value management table 15.

At step 111, the controller 12 of the disk storage device 11 acquires data on the number of accesses per unit time at the current time from the management program A 2.

At step 112, the controller 12 of the disk storage device 11 determines whether or not the acquired data exceeds the upper limit value.

At step 113, the controller 12 of the disk storage device 11 replicates the predetermined volume.

At step 114, the management program B 9 creates the access destination management table 18.

At step 115, the management program B 9 switches the volume to be accessed from the original volume to the replicated volume.

At step 116, the controller 12 determines whether or not the access distribution processing is valid.

Next, detailed description will be made below on the steps in FIG. 7 when the user controls accesses to the logical volume P 13.

At step 109, the user sets an upper limit value for the number of accesses to the logical volume P 13 per unit time for the controller 12 of the disk storage device 11.

At step 110, the controller 12 of the disk storage device 11 creates the upper limit value management table 15 comprised of the volume name 16 and upper limit value 17, as shown in FIG. 4, sets an upper limit value of 1000 [times/min] for the logical volume P 13, and enters the logical volume P 13 and the set upper limit value into the upper limit value management table 15.

At step 111, the controller 12 of the disk storage device 11 receives data on the number of accesses to the logical volume P 13 per unit time from an access monitoring unit 3 of the in the disk storage device 11. Upon receipt of the data, the controller 12 of the disk storage device 11 references the upper limit value management table 15 to retrieve the upper limit value of 1000 [times/min] for the logical volume P 13.

At step 112, the controller 12 of the disk storage device 11 determines whether or not the data acquired from the access monitoring unit 3 of the management program A 2 at step 111 exceeds the upper limit value of 1000 [times/min] retrieved from the upper limit value management table 15 at step 111. When the upper limit value of 1000 [times/min] is not exceeded, the processing flow proceeds to step 116. Conversely, when the upper limit value of 1000 [times/min] is exceeded, the processing flow proceeds to step 113. At step 113, the controller 12 of the disk storage device 11 creates a logical volume R 14 which is a mirror volume of the replication requested volume P 13.

At step 114, after the mirror volume has been completely created at step 113, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 114, the management program B 9 enters the names of the access requesting programs, i.e., the service programs A 5, B 6 into the access destination management table 18.

At step 115, when the service program C 7 additionally requests an access to the logical volume P 13 after step 114, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 116, the controller 12 of the disk storage device 11 determines the validity of the access control processing for distributing the accesses to the logical volume P 13. When determined as valid, the processing flow jumps back to step 111. When not determined as valid, the processing flow is terminated.

By executing steps 109 to 116 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Third Embodiment]

Figure 8:
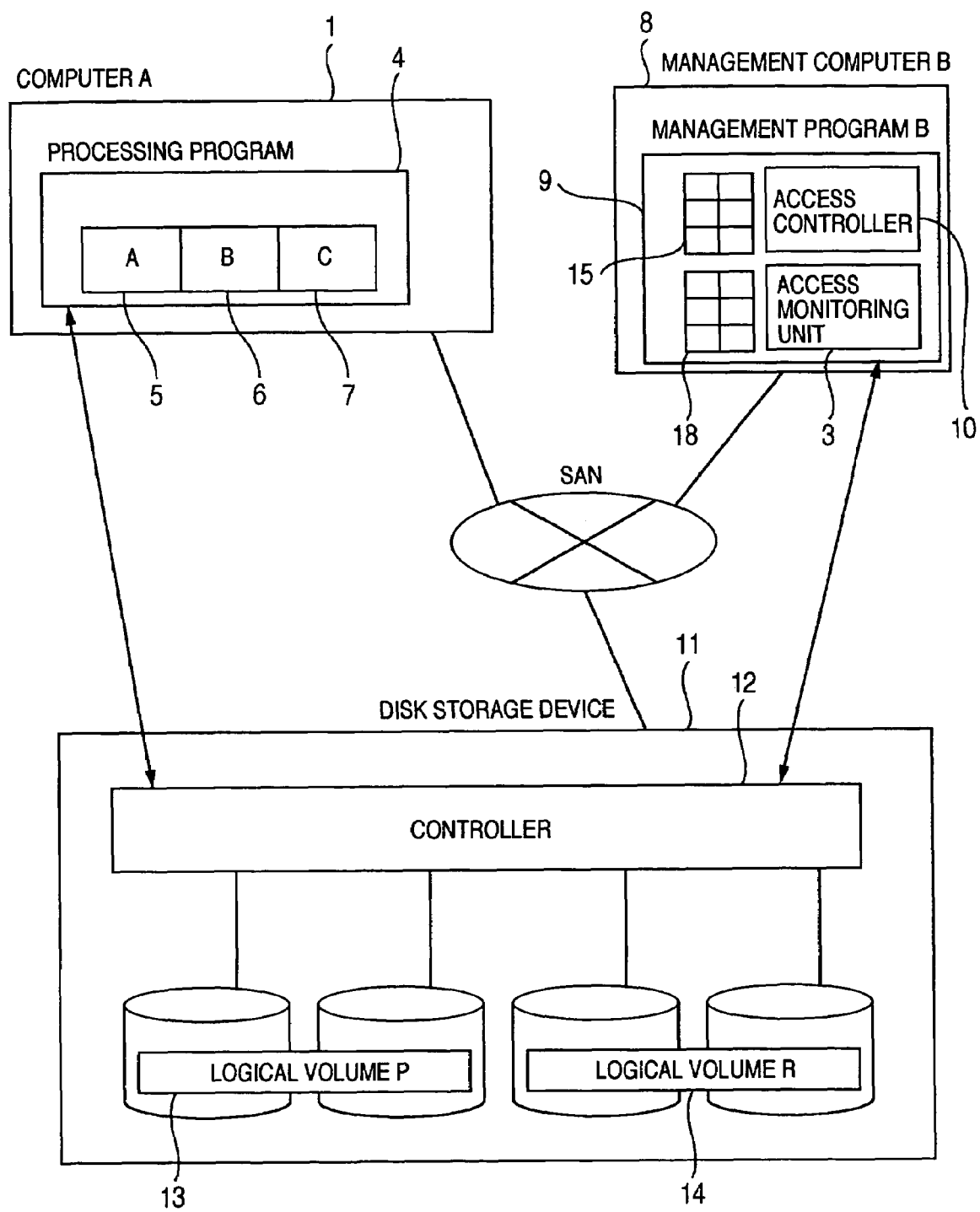
FIG. 8 is a block diagram illustrating the configuration of a system according to a third, a sixth, and a ninth embodiment.
Figure 9:
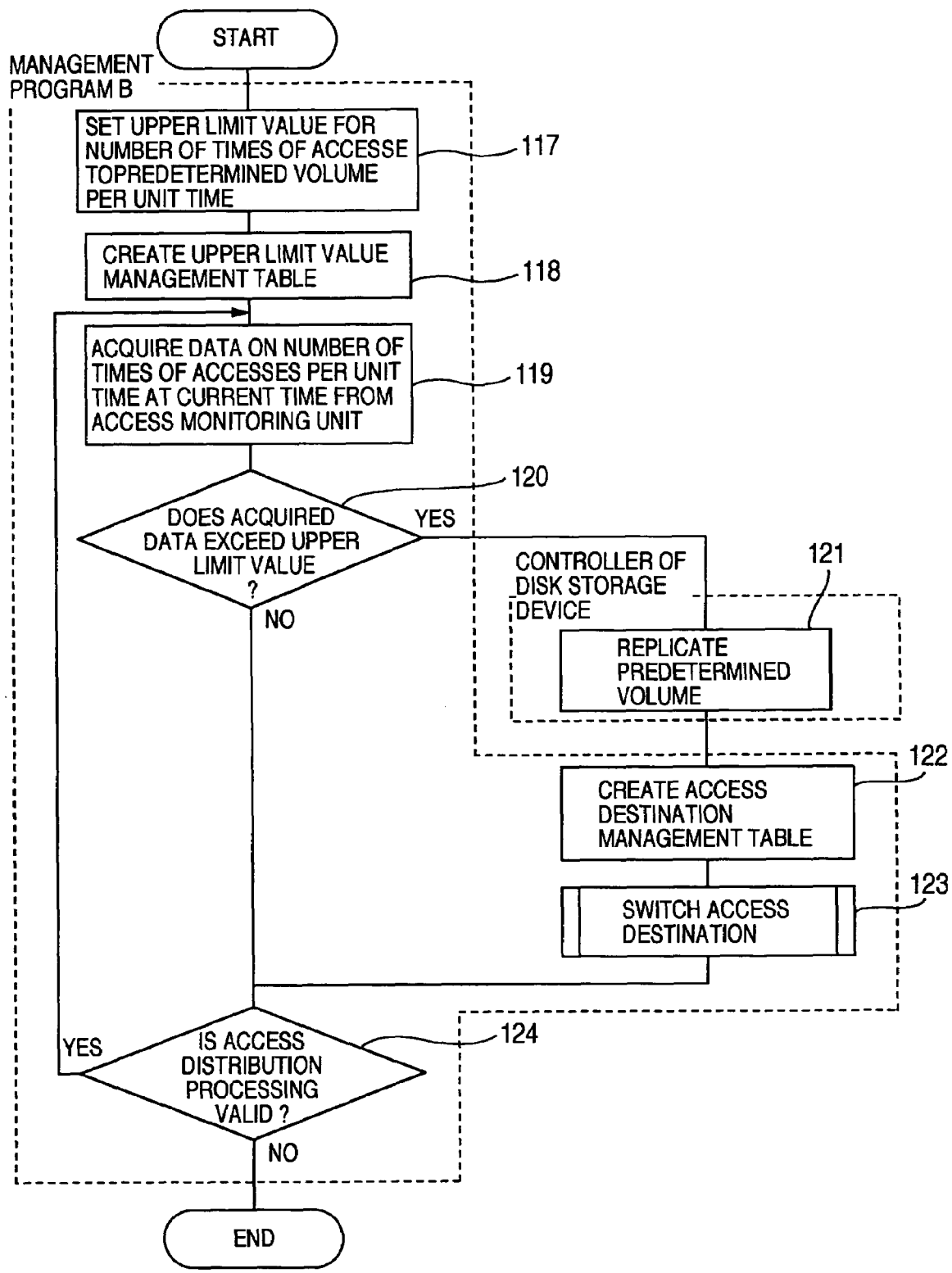
FIG. 9 is a flow chart generally illustrating a sequence of processing steps in the third embodiment.

FIG. 8 is a block diagram illustrating the configuration of a system according to a third embodiment. The illustrated system according to the third embodiment comprises a disk storage device 11 having a volume replication function; a computer A 1 which executes a processing program 4 that accesses the disk storage device 11; and a management computer B 8 which executes a management program B 9 for managing the disk storage device 11. A service program A 5 running on the processing program 4 generates an input/output request to a certain volume in the disk storage device 11, and a controller 12 of the disk storage device 11, upon receipt of the request, performs an input/output operation for the requested volume. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The third embodiment differs from the second embodiment in that the management program B 9 associated with the disk storage device 11 is responsible for the creation of the upper limit value management table 15, monitoring of the number of accesses, and the comparison of the monitored number of times with the upper limit value. FIG. 9 is a flow chart generally illustrating a sequence of processing steps in the third embodiment. The processing flow is outlined below.

At step 117, the management program B 9 receives an upper limit value set by the user for the number of accesses to a predetermined volume per unit time.

At step 118, the management program B 9 creates the upper limit value management table 15.

At step 119, the management program B 9 acquires data on the number of acesses per unit time at the current time from the management program A 2.

At step 120, the management program B 9 determines whether or not the acquired data exceeds the upper limit value.

At step 121, the controller 12 of the disk storage device 11 replicates the predetermined volume.

At step 122, the management program B 9 creates the access destination management table 18.

At step 123, the management program B 9 switches the volume to be accessed from the original volume to the replicated volume.

At step 124, the management program B 9 determines whether or not the access distribution processing is valid.

Next, detailed description will be made below on the steps in FIG. 9 when the user controls accesses to the logical volume P 13.

At step 117, the user sets an upper limit value of 1000 [times/min] for the number of accesses to the logical volume P 13 per unit time for the management program B 9.

At step 118, the management program B 9 creates the upper limit value management table 15 comprised of the volume name 16 and upper limit value 17, as shown in FIG. 4, sets an upper limit value of 1000 [times/min] for the logical volume P 13, and enters the logical volume P 13 and the set upper limit value into the upper limit value management table 15.

At step 119, the management program B 9 receives data on the number of accesses to the logical volume P 13 per unit time from an access monitoring unit 3 of the management program B 9. Upon receipt of the data, the management program B 9 references the upper limit value management table 15 to retrieve the upper limit value X for the logical volume P 13.

At step 120, the management program B 9 determines whether or not the data acquired from the access monitoring unit 3 of the management program A 2 at step 111 exceeds the upper limit value of 1000 [times/min] retrieved from the upper limit value management table 15 at step 111. When the upper limit value X is not exceeded, the processing flow proceeds to step 124. Conversely, when the upper limit value of 1000 [times/min] is exceeded, the processing flow proceeds to step 121.

At step 121, the management program B 9 requests the controller 12 of the disk storage device 11 to replicate the logical volume P 13. Upon receipt of the replication request, the controller 12 of the disk storage device 11 creates a logical volume R 14 which is a mirror volume of the replication requested volume P 13.

At step 122, after the mirror volume has been completely created at step 121, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 122, the management program B 9 enters the names of the access requesting programs, i.e., the service programs A 5, B 6 into the access destination management table 18.

At step 123, when the service program C 7 additionally requests an access to the logical volume P 13 after step 122, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21. Upon receipt of the notification, the controller 12 of the disk storage device 11 performs an input/output operation to the volume notified from the management program B 9.

At step 124, the management program B 9 determines the validity of the access control processing for distributing the accesses to the logical volume P 13. When determined as valid, the processing flow jumps back to step 119. When not determined as valid, the processing flow is terminated.

By executing steps 117 to 124 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Fourth Embodiment]

Figure 10:
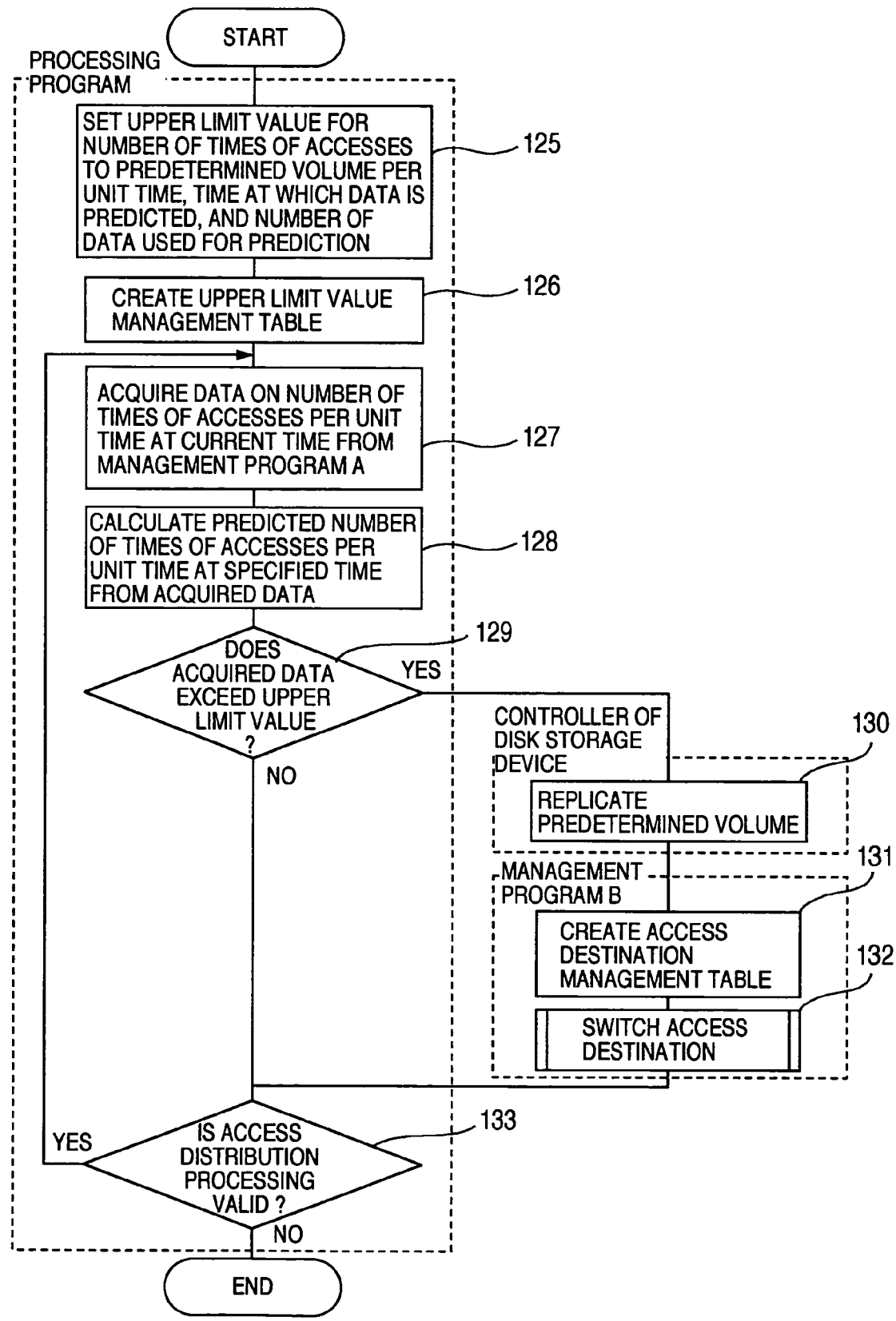
FIG. 10 is a flow chart generally illustrating a sequence of processing steps in the fourth embodiment.

FIG. 2 is a block diagram illustrating the configuration of a system according to a fourth embodiment. The illustrated system according to the fourth embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The fourth embodiment differs from the first embodiment in that the number of accesses is compared with an upper limit value at a specified time predicted from the number of accesses, which have been made until the current time, based on previously set items. FIG. 10 is a flow chart generally illustrating a sequence of processing steps in the fourth embodiment. The processing flow is outlined below.

At step 125, the processing program 4 receives an upper limit value for the number of accesses to a predetermined volume per unit time, a time at which data is predicted, and the number of data used for the prediction, all of which are set by the user.

At step 126, the processing program 4 creates the upper limit value management table 15.

At step 127, the processing program 4 acquires data on the number of times of accesses per unit time at the current time from the management program A 2.

At step 128, the processing program 4 calculates a predicted number of accesses per unit time at the specified time from the acquired data.

At step 129, the processing program 4 determines whether or not the acquired data exceeds the upper limit value.

At step 130, the controller 12 of the disk storage device 11 replicates the predetermined volume.

At step 131, the management program B 9 creates the access destination management table 18.

At step 132, the management program B 9 switches the volume to be accessed from the original volume to the replicated volume.

At step 133, the processing program 4 determines whether or not the access distribution processing is valid.

Next, detailed description will be made below on the steps in FIG. 10 when the user controls accesses to the logical volume P 13.

Figure 19A:
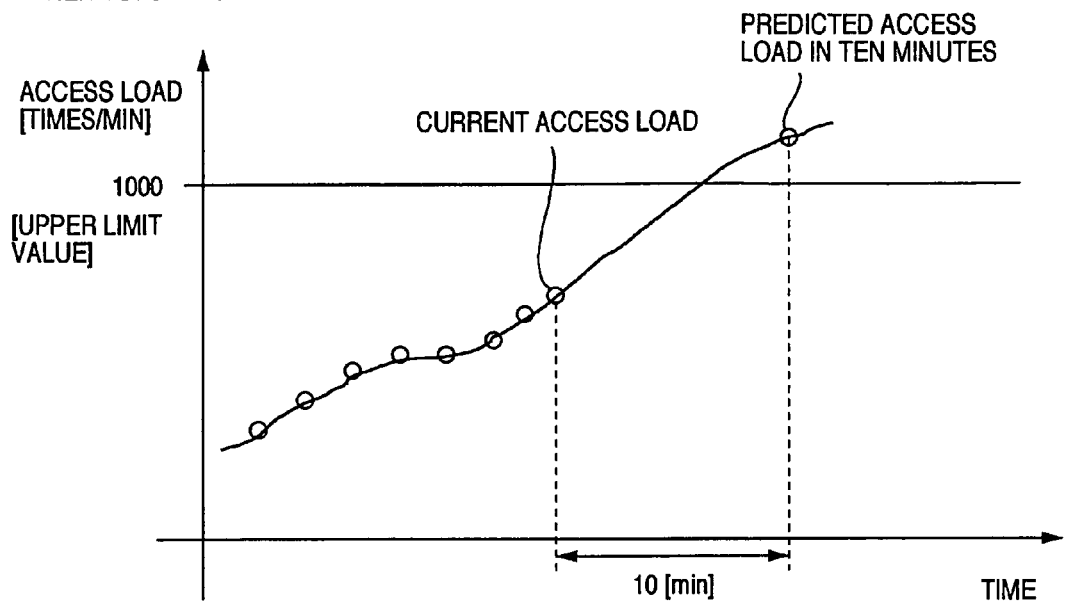
FIG. 19A is a diagram representing a determination made in the fourth, fifth, and sixth embodiments as to whether a predicted number of accesses exceeds an upper limit value when a target volume is replicated.
Figure 19B:
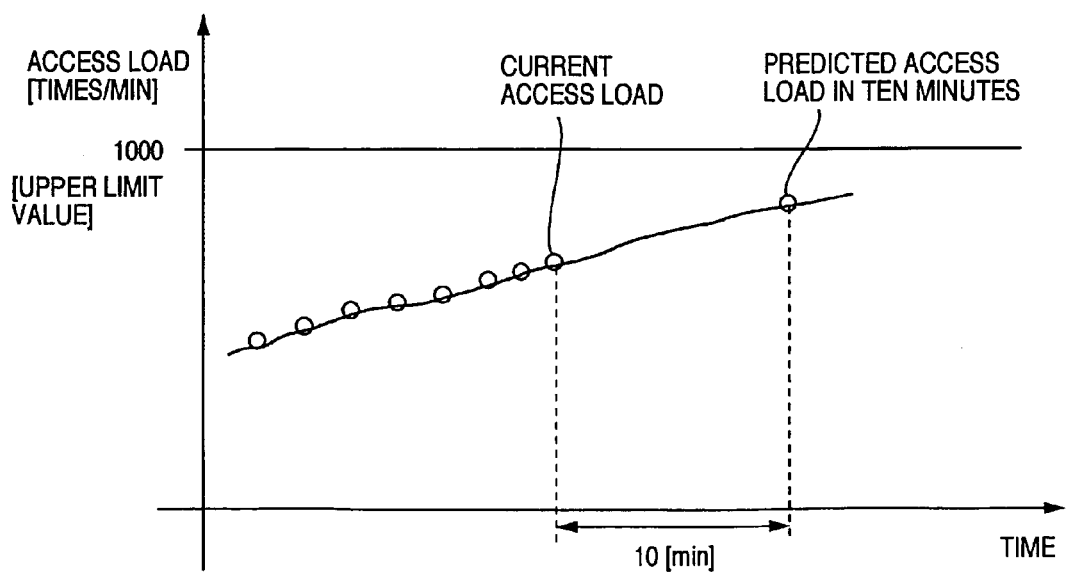
FIG. 19B is a diagram representing a determination made in the fourth, fifth, and sixth embodiments as to whether a predicted number of accesses exceeds an upper limit value when the target volume is not replicated.

At step 125, the user sets for the processing program 4 an upper limit value X for the number of accesses to the logical volume P 13 per unit time that is a condition for replicating the logical volume P 13. Since the aforementioned upper limit value of 1000 [times/min] has been set for a predicted number of accesses per unit time in ten minutes from the current time, the user sets the current time, a time period of 10 [min] to the time at which the processing program 4 predicts the number of accesses per unit time, and the number (i.e., amount) of data used may equal 8 [units] (see FIGS. 11 and 19A, 19B), for predicting the number of accesses per unit time.

At step 126, the processing program 4 creates an upper limit value management table 15 comprised of a volume name 16, a time period 22, the number of data 23, and an upper limit value 17, as shown in FIG. 11, and enters the set values into the upper limit value management table 15.

At step 127, the processing program 4 receives data on the number of accesses to the logical volume P 13 per unit time from an access monitoring unit 3 of the management program A 2.

At step 128, the processing program references the upper limit value management table 15 to retrieve the upper limit value of 1000 [times/min] for the logical volume P 13; the time period of 10 [min] to the time at which the processing program 4 predicts the number of accesses per unit time, and the number of data equal to 8 [units] used for predicting the number of accesses per unit time. The processing program 4 acquires eight data from a log of the number of accesses per unit time, which are relied on by the processing program 4 to calculate a predicted number of accesses per unit time in ten minutes from the current time.

At step 129, the processing program 4 determines whether or not the predicted number of accesses per unit time calculated at step 128 exceeds the upper limit value of 1000 [times/min] retrieved from the upper limit value management table 15 at step 127. When the upper limit value of 1000 [times/min] is not exceeded, as is the case shown in FIG. 19B where the logical volume P 13 need not be replicated, the processing flow proceeds to step 133. Conversely, when the upper limit value of 1000 [times/min] is exceeded, as is the case shown in FIG. 19A where the logical volume P 13 should be replicated, the processing flow proceeds to step 130.

At step 130, the processing program 4 requests the controller 12 of the disk storage device 11 to replicate the logical volume P 13. Upon receipt of the replication request, the controller 12 of the disk storage device 11 creates a logical volume R 14 which is a mirror volume of the logical volume P 13.

At step 131, after the mirror volume has been completely created at step 130, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 131, the management program B 9 enters the names of the access requesting volumes, i.e., the service programs A 5, B 6 into the access destination management table 18.

At step 132, when the service program C 7 additionally requests an access to the logical volume P 13 after step 131, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 133, the processing program 4 determines the validity of the access control processing for distributing the accesses to the logical volume P 13. When determined as valid, the processing flow jumps back to step 127. When not determined as valid, the processing flow is terminated.

By executing steps 125 to 133 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Fifth Embodiment]

Figure 12:
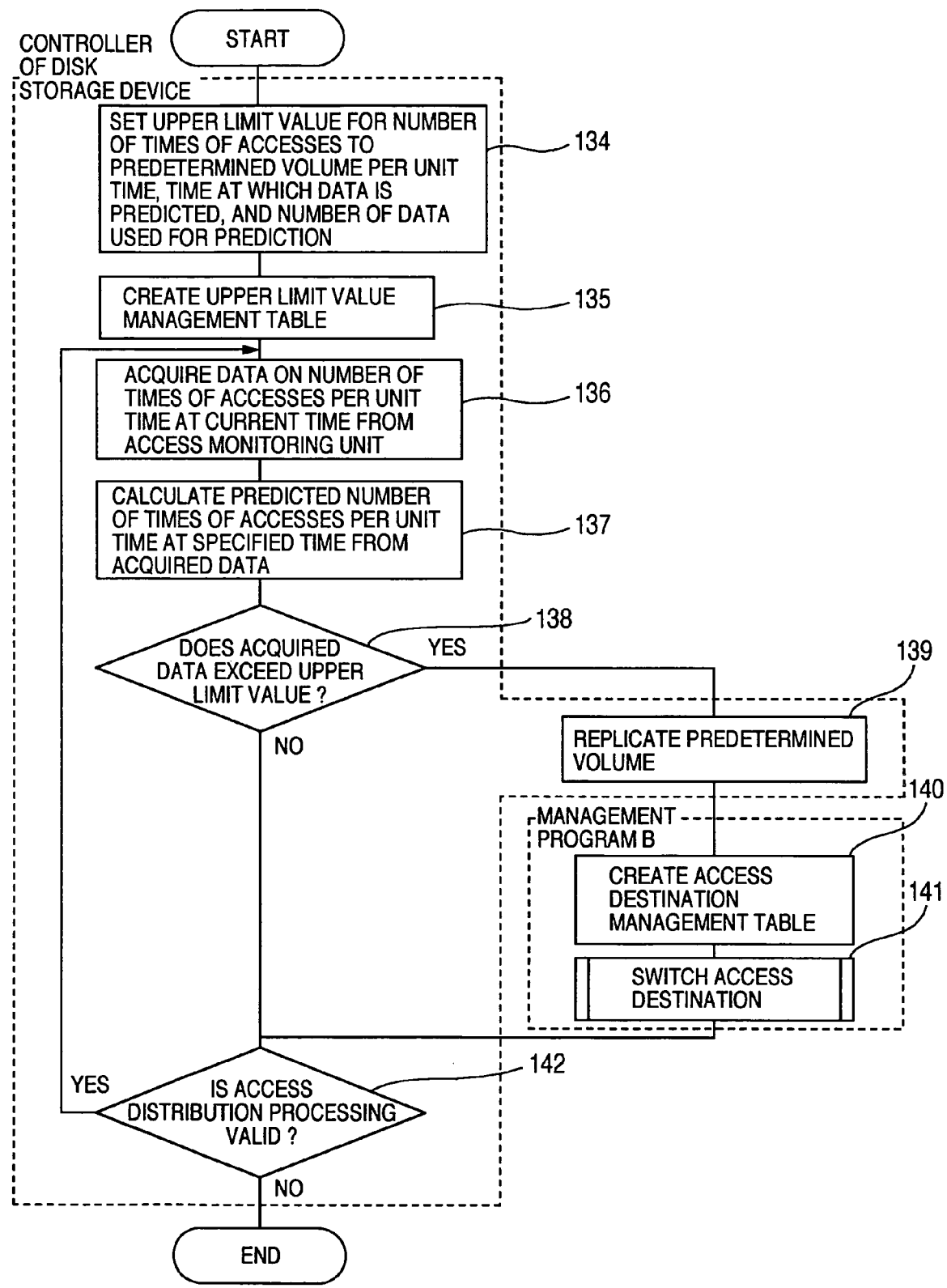
FIG. 12 is a flow chart generally illustrating a sequence of processing steps in the fifth embodiment.

FIG. 6 is a block diagram illustrating the configuration of a system according to a fifth embodiment. The illustrated system according to the fifth embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The fifth embodiment differs from the fourth embodiment in that the controller 12 of the disk storage device 11 is responsible for the creation of the upper limit value management table 15, monitoring of the number of accesses occur, and the comparison of the monitored number of times with the upper limit value. FIG. 12 is a flow chart generally illustrating a sequence of processing steps in the fifth embodiment. The processing flow is outlined below.

At step 134, the controller 12 of the disk storage device 11 receives an upper limit value for the number of accesses to a predetermined volume per unit time, a time at which data is predicted, and the number of data used for the prediction, all of which are set by the user.

At step 135, the controller 12 of the disk storage device 11 creates the upper limit value management table 15.

At step 136, the controller 12 of the disk storage device 11 acquires data on the number of accesses per unit time at the current time from the management program A 2.

At step 137, the controller 12 of the disk storage device 11 calculates a predicted number of accesses per unit time at the specified time from the acquired data.

At step 138, the controller 12 of the disk storage device 11 determines whether or not the acquired data exceeds the upper limit value.

At step 139, the controller 12 of the disk storage device 11 replicates the predetermined volume.

At step 140, the management program B 9 creates the access destination management table 18.

At step 141, the management program B 9 switches the volume to be accessed from the original volume to the replicated volume.

At step 142, the controller 12 of the disk storage device 11 determines whether or not the access distribution processing is valid.

Next, detailed description will be made below on the steps in FIG. 12 when the user controls accesses to the logical volume P 13.

At step 134, the user sets for the controller 12 of the disk storage device 11 an upper limit value of 1000 [times/min] for the number of accesses to the logical volume P 13 per unit time that is a condition for replicating the logical volume P 13. Since the aforementioned upper limit value of 1000 [times/min] has been set for a predicted number of accesses per unit time in ten minutes from the current time, the user sets the current time, a time period of 10 [min] to the time at which the processing program 4 predicts the number of accesses per unit time, and the number of data used being equal to 8 [units] for predicting the number of accesses per unit time.

At step 135, the controller 12 of the disk storage device 11 creates the upper limit value management table 15 comprised of the volume name 16, time period 22, number of data 23, and upper limit value 17, as shown in FIG. 11, and enters the set values into the upper limit value management table 15.

At step 136, the controller 12 of the disk storage device 11 receives data on the number of accesses to the logical volume P 13 per unit time from an access monitoring unit 3 in the controller of the disk storage device 11.

At step 137, the controller 12 of the disk storage device 11 references the upper limit value management table 15 to retrieve the upper limit value of 1000 [times/min] for the logical volume P 13; the time period of 10 [min] to the time at which the processing program 4 predicts the number of accesses per unit time, and the number of data used is equal to 8 [units] for predicting the number of accesses per unit time. The processing program 4 acquires eight data from a log of the number of accesses per unit time, which are relied on by the processing program 4 to calculate a predicted number of accesses per unit time in ten minutes from the current time.

At step 138, the controller 12 of the disk storage device 11 determines whether or not the predicted number of accesses per unit time calculated at step 137 exceeds the upper limit value of 1000 [times/min] retrieved from the upper limit value management table 15 at step 136. When the upper limit value of 1000 [times/min] is not exceeded, as is the case shown in FIG. 19B where the logical volume P 13 need not be replicated, the processing flow proceeds to step 142. Conversely, when the upper limit value of 1000 [times/min] is exceeded, as is the case shown in FIG. 19A where the logical volume P 13 should be replicated, the processing flow proceeds to step 139.

At step 139, the controller 12 of the disk storage device 11 creates a logical volume R which is a mirror volume of the logical volume P 13.

At step 140, after the mirror volume has been completely created at step 139, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 140, the management program B 9 enters the names of the access requesting programs, i.e., the service programs A 5, B 6 into the access destination management table 18.

At step 141, when the service program C 7 additionally requests an access to the logical volume P 13 after step 140, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 142, the controller 12 of the disk storage device 11 determines the validity of the access control processing for distributing the accesses to the logical volume P 13. When determined as valid, the processing flow jumps back to step 136. When not determined as valid, the processing flow is terminated.

By executing steps 134 to 142 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Sixth Embodiment]

Figure 13:
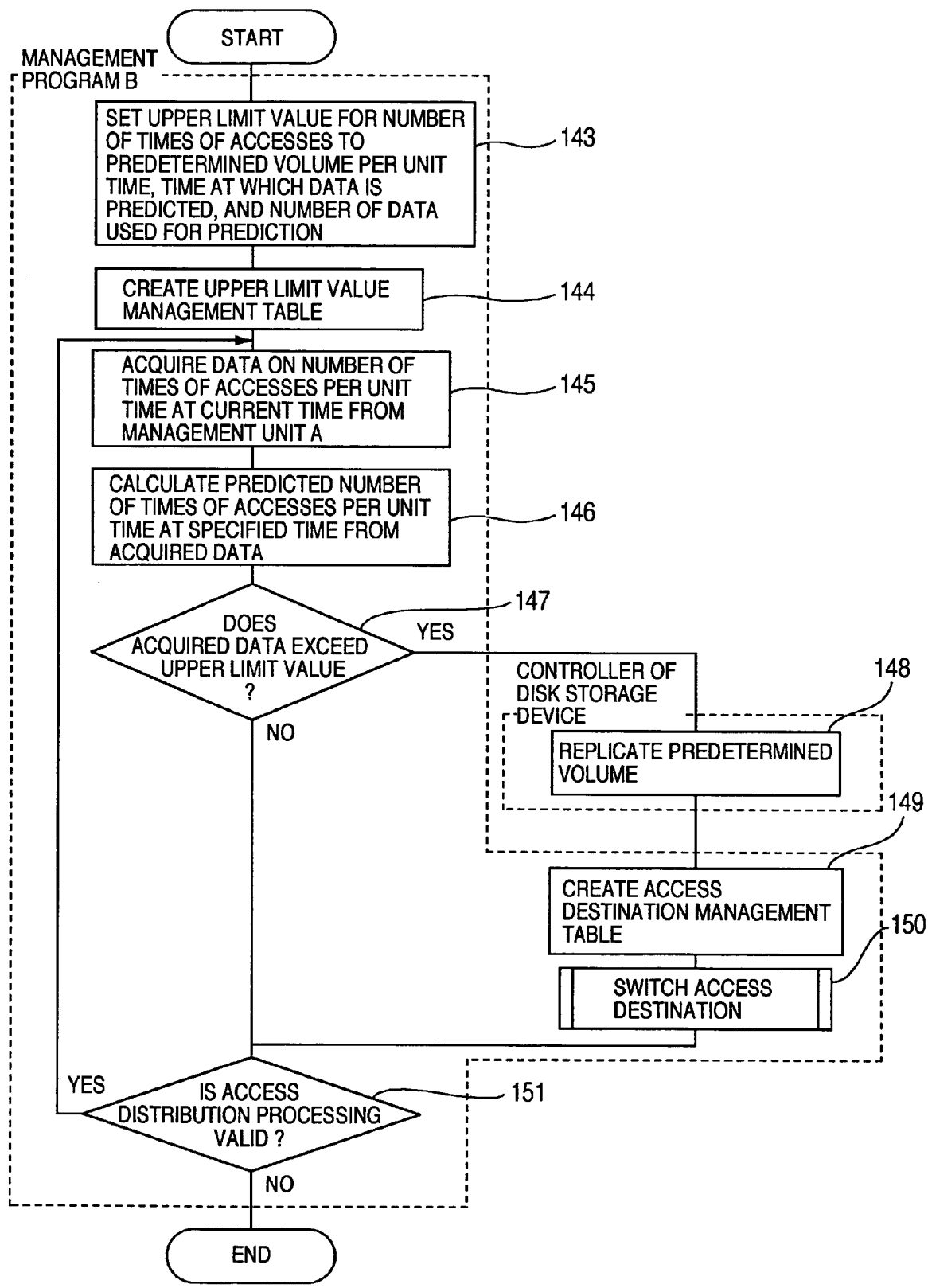
FIG. 13 is a flow chart generally illustrating a sequence of processing steps in the sixth embodiment.

FIG. 8 is a block diagram illustrating the configuration of a system according to a sixth embodiment. The illustrated system according to the sixth embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The sixth embodiment differs from the fifth embodiment in that the management program B 9 associated with the disk storage device 11 is responsible for the creation of the upper limit value management table 15, monitoring of the number of accesses, and the comparison of the monitored number of times with the upper limit value. FIG. 13 is a flow chart generally illustrating a sequence of processing steps in the sixth embodiment. The processing flow is outlined below.

At step 143, the management program B 9 receives an upper limit value for the number of accesses to a predetermined volume per unit time, a time at which data is predicted, and the number of data used for the prediction, all of which are set by the user.

At step 144, the management program B 9 creates the upper limit value management table 15.

At step 145, the management program B 9 acquires data on the number of accesses per unit time at the current time from the management program A 2.

At step 146, the management program B 9 calculates a predicted number of accesses per unit time at the specified time from the acquired data.

At step 147, the management program B 9 determines whether or not the acquired data exceeds the upper limit value.

At step 148, the controller 12 of the disk storage device 11 replicates the predetermined volume.

At step 149, the management program B 9 creates the access destination management table 18.

At step 150, the management program B 9 switches the volume to be accessed from the original volume to the replicated volume.

At step 151, the management program B 9 determines whether or not the access distribution processing is valid.

Next, detailed description will be made below on the steps in FIG. 13 when the user controls accesses to the logical volume P 13.

At step 143, the user sets for the management program B 9 an upper limit value of 1000 [times/min] for the number of accesses to the logical volume P 13 per unit time that is a condition for replicating the logical volume P 13. Since the aforementioned upper limit value of 1000 [times/min] has been set for a predicted number of accesses per unit time in ten minutes from the current time, the user sets the current time, a time period of 10 [min] to the time at which the management program B 9 predicts the number of accesses per unit time, and the number of data used being equal 8 [units] for predicting the number of accesses per unit time.

At step 144, the management program B 9 creates the upper limit value management table 15 comprised of the volume name 16, time period 22, number of data 23, and upper limit value 17, as shown in FIG. 11, and enters the set values into the upper limit value management table 15.

At step 145, the management program B 9 receives data on the number of accesses to the logical volume P 13 per unit time from an access monitoring unit 3 of the management program B 9.

At step 146, the management program B 9 references the upper limit value management table 15 to retrieve the upper limit value of 1000 [times/min] for the logical volume P 13; the time period of 10 [min] to the time at which the management program B 9 predicts the number of accesses per unit time, and the number of data used is equal to 8 [units] for predicting the number of accesses per unit time. The management program B 9 acquires eight data from a log of the number of accesses per unit time, which are relied on by the management program B 9 to calculate a predicted number of accesses per unit time in ten minutes from the current time.

At step 147, the management program B 9 determines whether or not the predicted number of accesses per unit time calculated at step 146 exceeds the upper limit value of 1000 [times/min] retrieved from the upper limit value management table 15 at step 145. When the upper limit value of 1000 [times/min] is not exceeded, as is the case shown in FIG. 19B where the logical volume P 13 need not be replicated, the processing flow proceeds to step 151. Conversely, when the upper limit value of 1000 [times/min] is not exceeded, as is the case shown in FIG. 19A where the logical volume P 13 should be replicated, the processing flow proceeds to step 148.

At step 148, the management program B 9 requests the controller 12 of the disk storage device 11 to replicate the logical volume P 13. Upon receipt of the replication request, the controller 12 of the disk storage device 11 creates a logical volume R 14 which is a mirror volume of the logical volume P 13.

At step 149, after the mirror volume has been completely created at step 148, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 149, the management program B 9 enters the names of the access requesting programs, i.e., the service programs A 5, B 6 into the access destination management table 18.

At step 150, when the service program C 7 additionally requests an access to the logical volume P 13 after step 149, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 151, the management program B 9 determines the validity of the access control processing for distributing the accesses to the logical volume P 13. When determined as valid, the processing flow jumps back to step 145. When not determined as valid, the processing flow is terminated.

By executing steps 143 to 151 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Seventh Embodiment]

Figure 14:
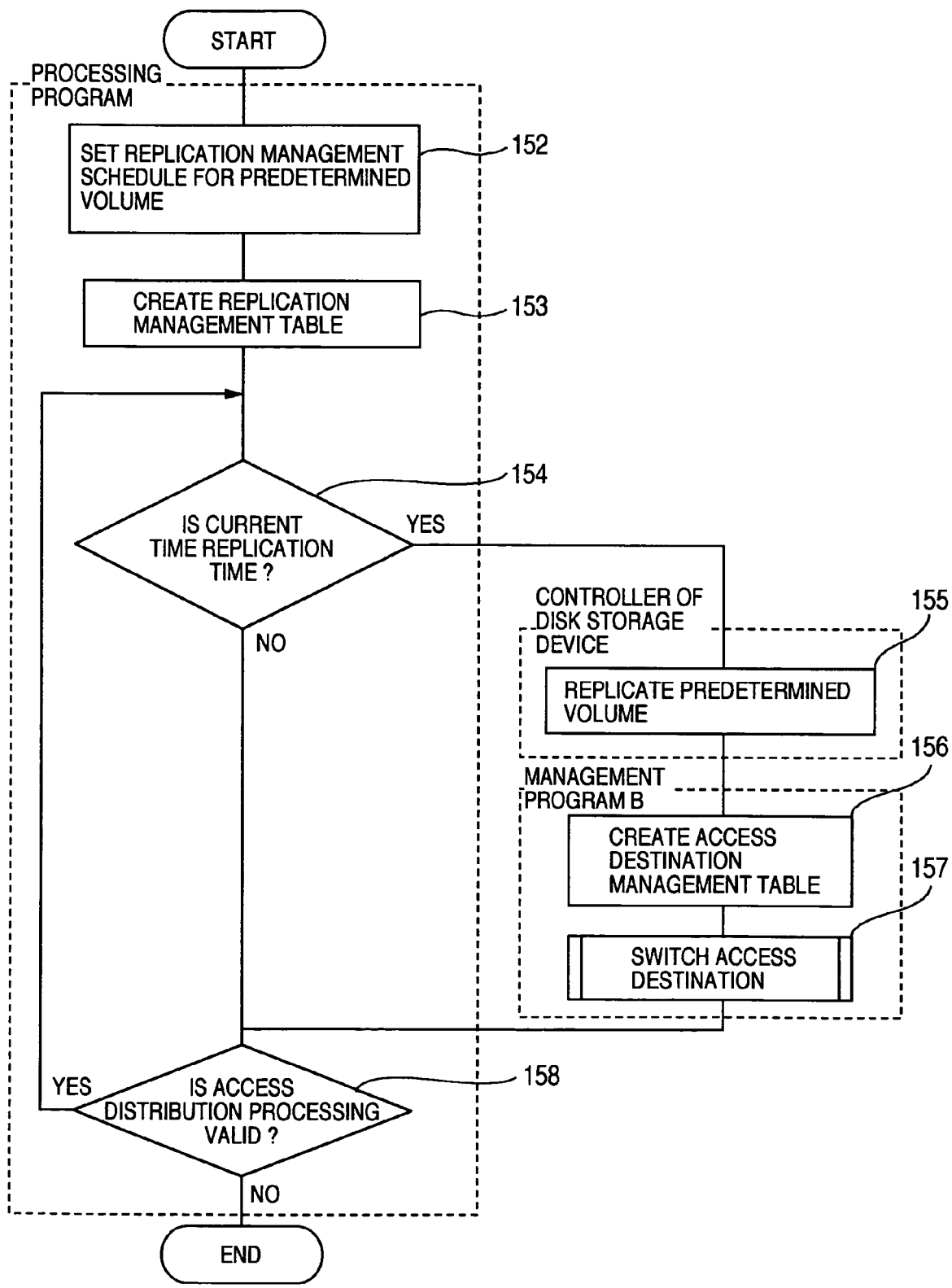
FIG. 14 is a flow chart generally illustrating a sequence of processing steps in the seventh embodiment.

FIG. 2 is a block diagram illustrating the configuration of a system according to a seventh embodiment. The illustrated system according to the seventh embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The seventh embodiment differs from the first embodiment in that the user does not set an upper limit value but sets a replication management schedule 24 for creating a replica at a specified time, such that a volume is replicated based on the replication management schedule 24. FIG. 14 is a flow chart generally illustrating a sequence of processing steps in the seventh embodiment. The processing flow is outlined below.

At step 152, the processing program 4 receives the replication management schedule 24 set by the user for a predetermined volume.

At step 153, the processing program 4 creates a replication management table 25.

At step 154, the processing program 4 determines whether or not the current time is specified as a replication time.

At step 155, the controller 12 of the disk storage device 11 replicates the predetermined volume.

At step 156, the management program B 9 creates the access destination management table 18.

At step 157, the management program B 9 switches the volume to be accessed from the original volume to the replicated volume.

At step 158, the processing program 4 determines whether or not the access distribution processing is valid.

Next, detailed description will be made below on the steps in FIG. 14 when the user controls accesses to the logical volume P 13.

Figure 15:
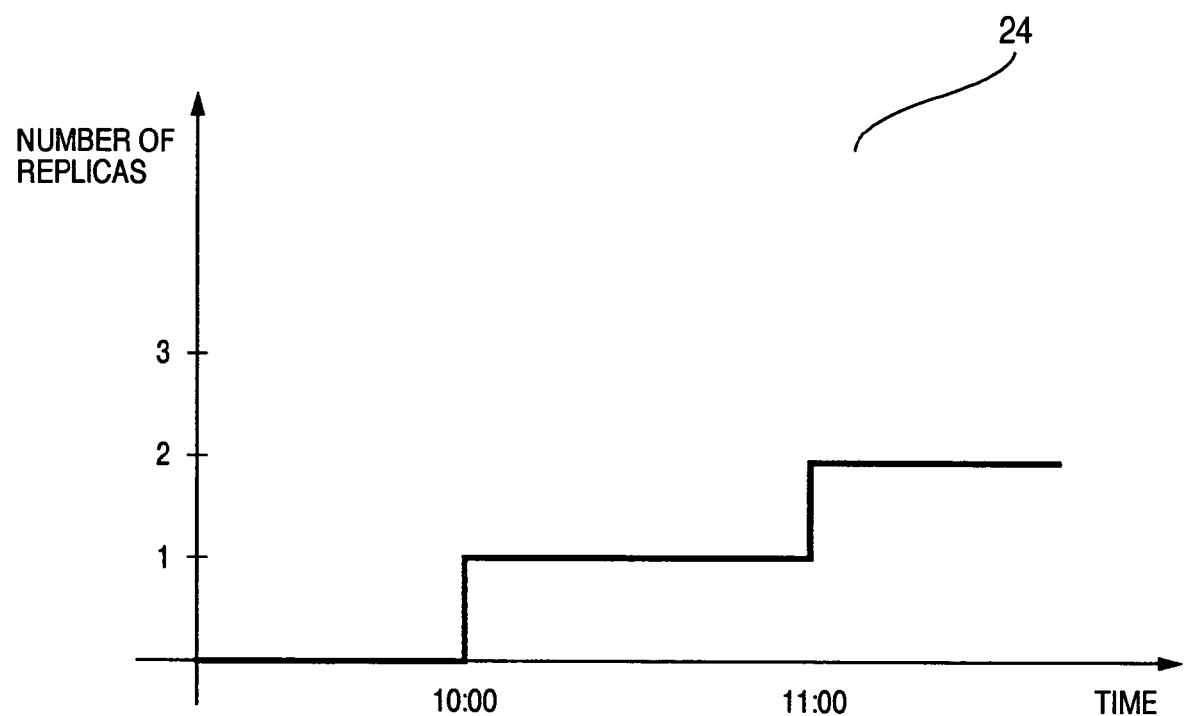
FIG. 15 is a graph representing a replication management schedule.

At step 152, the user creates for the processing program 4 the replication management schedule 24 which indicates a change in the number of replicas of the logical volume P 13 over time. FIG. 15 shows the replication management schedule 24. The replication management schedule 24 indicates the number of replicas at each time, and FIG. 15 represents a schedule for creating one replica at specified time 10:00, and creating another replica at specified time 11:00.

At step 153, the processing program 4 creates the replication management table 25 which indicates replication times based on the replication management schedule 24 created at step 152 and is comprised of a volume name 16, the total number of volumes to be replicated 26, and a replication end time 27, as shown in FIG. 16, and enters set values into the replication management table 25.

At step 154, the processing program 4 acquires the current time from the operating system, and references the replication management table 25 to determine whether or not any replication end time is equal to the sum of the current time and the time required to replicate a volume. If no such replication end time is found in the replication management table 25, the processing flow proceeds to step 158. Conversely, if such a replication end time is found, the processing flow proceeds to step 155.

At step 155, the processing program 4 requests the controller 12 of the disk storage device 11 to replicate the logical volume P 13. Upon receipt of the replication request, the controller 12 of the disk storage device 11 creates a logical volume R 14 which is a mirror volume of the replication requested volume P 13.

At step 156, after the mirror volume has been completely created at step 155, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 156, the control program B 9 enters the names of the access requesting programs, i.e., service programs A 5 and B 6 into the access destination management table 18.

At step 157, when the service program C 7 additionally requests an access to the logical volume P 13 after step 156, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 158, the processing program 4 determines the validity of the access control processing for distributing the accesses to the logical volume P 13. When determined as valid, the processing flow jumps back to step 154. When not determined as valid, the processing flow is terminated.

By executing steps 152 to 158 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Eighth Embodiment]

Figure 17:
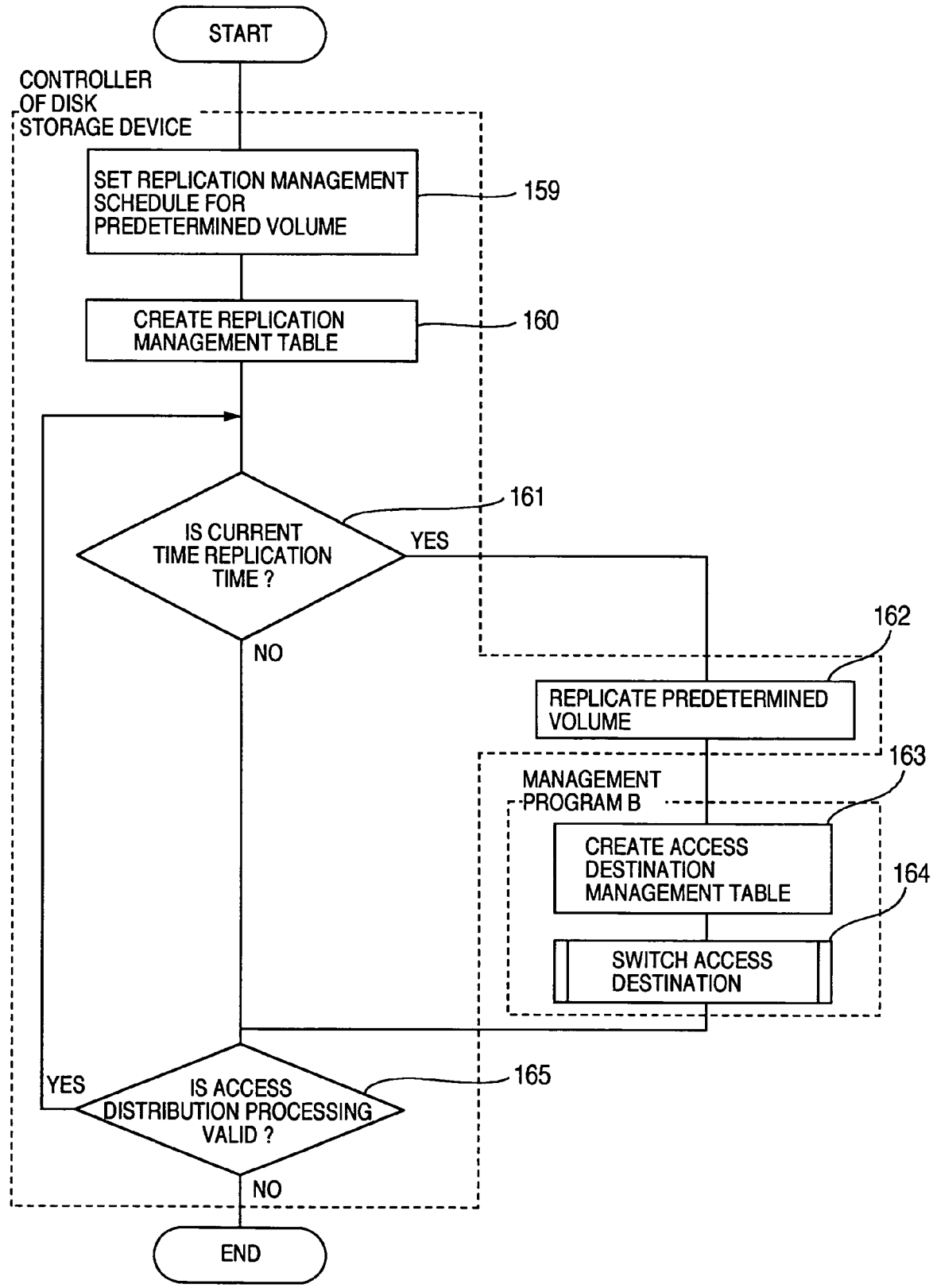
FIG. 17 is a flow chart generally illustrating a sequence of processing steps in the eighth embodiment.

FIG. 6 is a block diagram illustrating the configuration of a system according to an eighth embodiment. The illustrated system according to the eighth embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The eighth embodiment differs from the seventh embodiment in that the controller 12 of the disk storage device 11 is responsible for the creation of the replication management schedule 24 and replication management table 25, and the determination as to whether or not a replication time is reached. FIG. 17 is a flow chart generally illustrating a sequence of processing steps in the eighth embodiment. The processing flow is outlined below.

At step 159, the controlle r 12 of the disk storage device 11 receives the replication management schedule 24 set by the user for a predetermined volume.

At step 160, the controller 12 of the disk storage device 11 creates the replication management table 25.

At step 161, the controller 12 of the disk storage device 11 determines whether or not the current time is specified as a replica creation time.

At step 162, the controller 12 of the disk storage device 11 replicates the predetermined volume.

At step 163, the management program B 9 creates the access destination management table 18.

At step 164, the management program B 9 switches the volume to be accessed from the original volume to the replicated volume.

At step 165, the controller 12 of the disk storage device 11 determines whether or not the access distribution processing is valid.

Next, detailed description will be made below on the steps in FIG. 17 when the user controls accesses to the logical volume P 13.

At step 159, the user creates for the controller 12 of the disk storage device 11 the replication management schedule 24 which indicates a change in the number of replicas of the logical volume P 13 over time. FIG. 15 shows the replication management schedule 24. The replication management schedule 24 indicates the number of replicas at each time, and FIG. 15 represents a schedule for creating one replica at specified time 10:00, and creating another replica at specified time 11:00.

At step 160, the controller 12 of the disk storage device 11 creates the replication management table 25 shown which indicates replication times based on the replication management schedule 24 created at step 152 and is comprised of the volume name 16, total number of volumes to be replicated 26, and replication end time 27, as shown in FIG. 16, and enters set values into the replication management table 25.

At step 161, the controller 12 of the disk storage device 11 acquires the current time from the operating system, and references the replication management table 25 to determine whether or not any replication end time is equal to the sum of the current time and the time required to replicate a volume. If no such replication end time equal to the sum is found in the replication management table 25, the processing flow proceeds to step 165. Conversely, if such a replication end time equal to the sum is found, the processing flow proceeds to step 162.

At step 162, the controller 12 of the disk storage device 11 creates a logical volume R 14 which is a mirror volume of the replication requested volume P 13.

At step 163, after the mirror volume has been completely created at step 162, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 163, the control program B 9 enters the names of the access requesting programs, i.e., the service programs A 5 and B 6 into the access destination management table 18.

At step 164, when the service program C 7 additionally requests an access to the logical volume P 13 after step 163, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 165, the controller 12 of the disk storage device 11 determines the validity of the access control processing for distributing the accesses to the logical volume P 13. When determined as valid, the processing flow jumps back to step 161. When not determined as valid, the processing flow is terminated.

By executing steps 159 to 165 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

[Ninth Embodiment]

Figure 18:
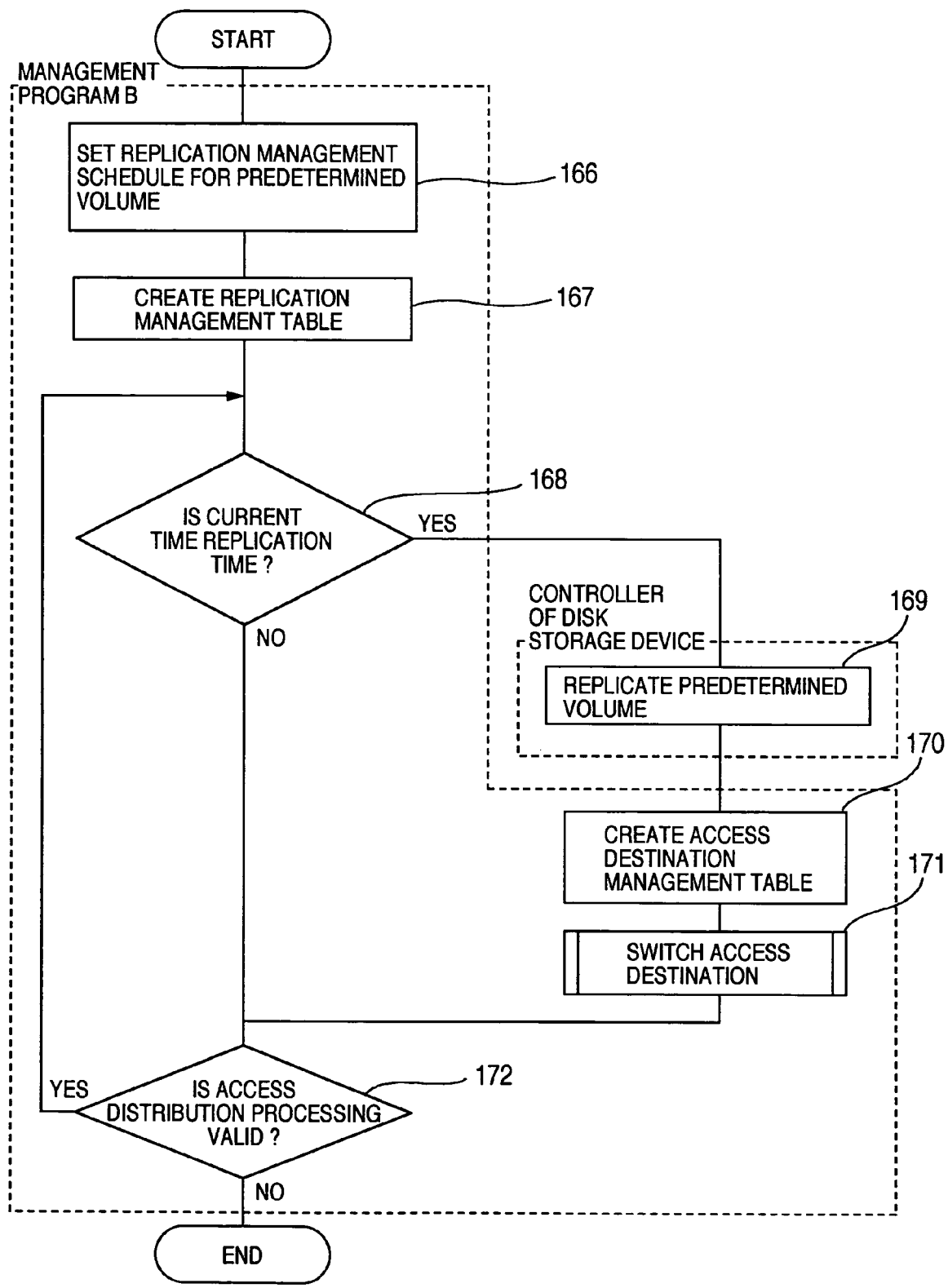
FIG. 18 is a flow chart generally illustrating a sequence of processing steps in the ninth embodiment.

FIG. 8 is a block diagram illustrating the configuration of a system according to a ninth embodiment. The illustrated system according to the ninth embodiment comprises a disk storage device 11 having a volume replication function; a computer A 1 which executes a processing program 4 for accessing the disk storage device 11; and a management computer B 8 which executes a management program B 9 for managing the disk storage device 11. A service program A 5 running on the processing program 4 generates an input/output request to a certain volume in the disk storage device 11. In response to the request, a controller 12 of the disk storage device 11 performs an input/output operation for the volume associated with the request. The disk storage device 11 is systematically managed by the management program B 9 which runs on the management computer B 8. Such configured systems are, as shown below, capable of dynamically distributing accesses concentrated on a predetermined volume from a plurality of service programs, such as when the service program A 5, a service program B 6, and a service program C 7 access to a logical volume P 13. The ninth embodiment differs from the eighth embodiment in that the management program B 9 associated with the disk storage device 11 is responsible for the creation of the replication management schedule 24 and replication management table 25, and the determination as to whether or not a replication time is reached. FIG. 18 is a flow chart generally illustrating a sequence of processing steps in the ninth embodiment. The processing flow is outlined below.

At step 166, the management program B 9 receives the replication management schedule 24 set by the user for a predetermined volume.

At step 167, the management program B 9 creates the replication management table 25.

At step 168, the management program B 9 determines whether or not the current time is specified as a replica creation time.

At step 169, the controller 12 of the disk storage device 11 replicates the predetermined volume.

At step 170, the management program B 9 creates the access destination management table 18.

At step 171, the management program B 9 switches the volume to be accessed from the original volume to the replicated volume.

At step 172, the management program B 9 determines whether or not the access distribution processing is valid.

Next, detailed description will be made below on the steps in FIG. 18 when the user controls accesses to the logical volume P 13.

At step 166, the user creates for the management program B 9 the replication management schedule 24 which indicates a change in the number of replicas of the logical volume P 13 over time. FIG. 15 shows the replication management schedule 24. The replication management schedule 24 indicates the number of replicas at each time, and FIG. 15 represents a schedule for creating one replica at specified time 10:00, and creating another replica at specified time 11:00.

At step 167, the management program B 9 creates the replication management table 25 which indicates replication times based on the replication management schedule 24 created at step 166 and is comprised of the volume name 16, total number of volumes to be replicated 26, and replication end time 27, as shown in FIG. 16, and enters set values into the replication management table 25.

At step 168, the management program B 9 acquires the current time, and references the replication management table 25 to determine whether or not any replication end time is equal to the sum of the current time and the time required to replicate a volume. If no such replication end time equal to the sum is found in the replication management table 25, the processing flow proceeds to step 172. Conversely, if such a replication end time equal to the sum is found, the processing flow proceeds to step 169.

At step 169, the management program B 9 requests the controller 12 of the disk storage device 11 to replicate the logical volume P 13. Upon receipt of the replication request, the controller 12 of the disk storage device 11 creates a logical volume R 14 which is a mirror volume of the replication requested volume P 13.

At step 170, after the mirror volume has been completely created at step 169, the controller 12 of the disk storage device 11 notifies the management program B 9 running on the management computer B 8 of the completion of replication. Upon receipt of the notification of the completed replication, an access controller 10 of the management program B 9 creates the access destination management table 18 comprised of the program name 19, access requested volume name 20, and accessed volume name 21, as shown in FIG. 5. The access requested volume name 20 indicates the name of a volume which is requested for an access by each service program that requests an access to the logical volume P 13, while the accessed volume name 21 indicates the name of a volume which is actually accessed by the service program. When the service programs A 5 and B 6 are to access the logical volume P 13 at the time of step 170, the control program B 9 enters the names of the access requesting programs, i.e., the service programs A 5 and B 6 into the access destination management table 18.

At step 171, when the service program C 7 additionally requests an access to the logical volume P 13 after step 170, the management program B 9 enters data into the access destination management table 18 such that the service program C 7 is forced to access the logical volume R 14. In other words, the volume accessed by the service program C 7 is changed from the logical volume P 13 to the logical volume R 14. When an access is requested to the logical volume P 13 from a service program which has been previously registered in the access destination management table 18, the management program B 9 references the access destination management table 18 to retrieve the accessed volume name 21. The management program B 9 notifies the controller 12 of the disk storage device 11 of the accessed volume from the accessed volume name 21 retrieved from the access destination management table 18. Upon receipt of the notification, the controller 12 of the disk storage device 11 performs an input/output operation to the volume notified from the management program B 9.

At step 172, the management program B 9 determines the validity of the access control processing for distributing the accesses to the logical volume P 13. When determined as valid, the processing flow jumps back to step 168. When not determined as valid, the processing flow is terminated.

By executing steps 166 to 172 described above, the system internally carries out the replication of the logical volume P 13 and the switching of the accessed volume from the logical volume P 13 to the replicated volume R 14, which are involved in the distribution of disk accesses to the logical volume P 13 specified by the user, thereby advantageously limiting the number of times of disk accesses to the logical volume P 13 to a certain value or less.

Figure 20:
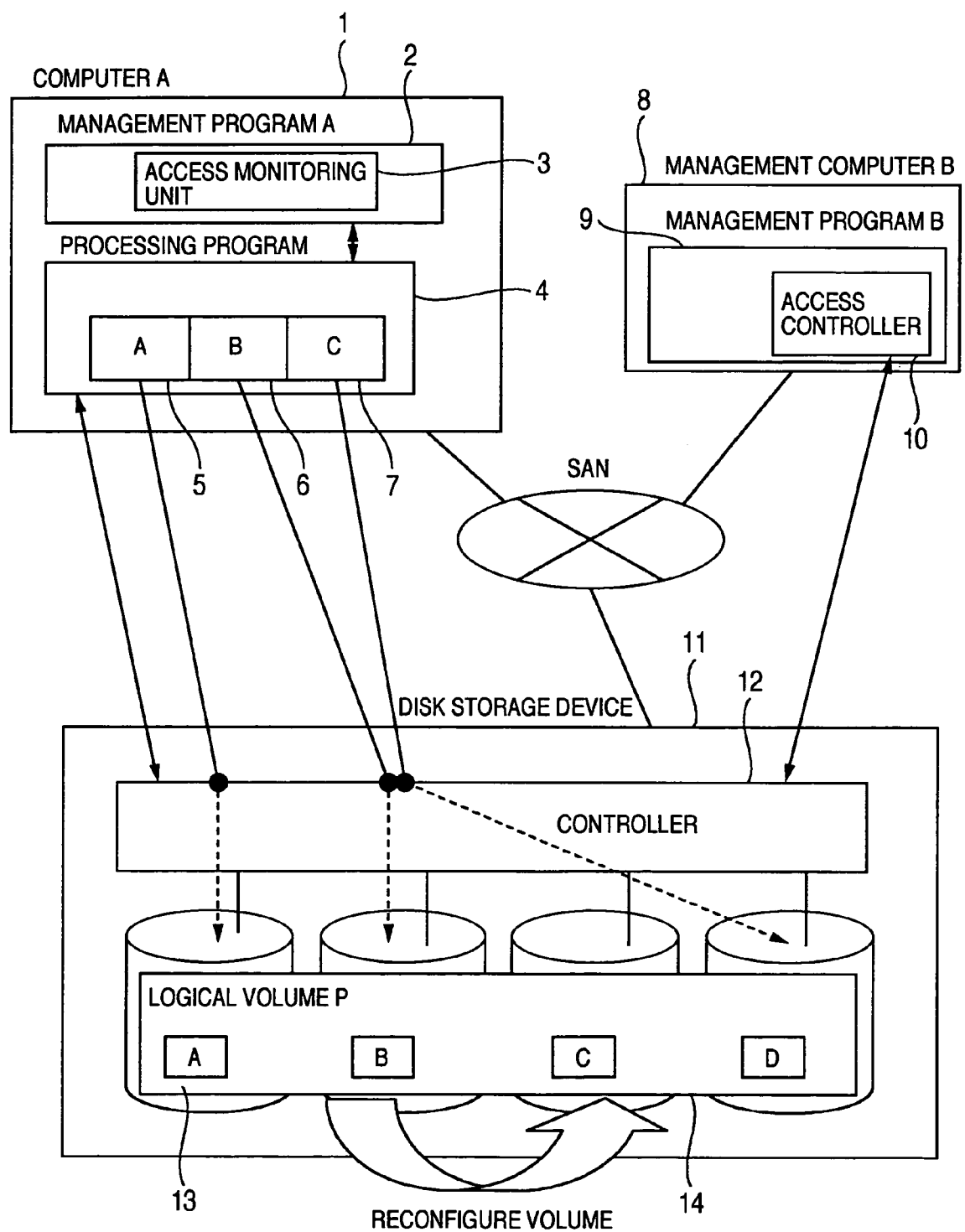
FIG. 20 is a diagram showing the principles of distributing a load by re-configuring volumes.

FIG. 20 shows a still further embodiment according to the present invention. In this embodiment, upon detecting that the number of accesses are larger than a pre-set upper limit value a plurality of disk volumes are created for reducing loads for each of volumes. That is, in the embodiment shown in FIG. 1, mirror volumes 14 are prepared in response to the detection of the access number for a pair of volumes P including data A, B, C and D. In the embodiment shown in FIG. 20, data A, B, C and D are recorded into each of disk volumes. In such configured arrangement, it becomes possible to reduce loads of each of disk volumes.

It should be further understood by those skilled in the art that although the foregoing description has been made in connection with the numerous disclosed example embodiments of the invention, the invention is not limited thereto and various changes and modifications may be made without departing from the spirit of the invention and the scope of the appended claims.

The invention claimed is:

1. A disk access control method for use in a data processing system comprising a disk storage device having a volume replication function, a first computer for executing a processing program for accessing said disk storage device, and a management computer for managing said disk storage device for controlling accesses made by a plurality of service programs in said processing program on said first computer to a predetermined volume in said disk storage device, said method comprising the steps of:

setting an upper limit value for a number of accesses to the predetermined volume per unit time to allow said processing program on said first computer to create an upper limit value management table indicating an upper limit value for the number of accesses to each volume per unit time;

acquiring the number of accesses to the predetermined volume to be accessed per unit time from an access monitoring unit of a management program A on said first computer to allow said processing program on said first computer to monitor the number of accesses to the predetermined volume per unit time;

determining whether or not the number of accesses per unit time acquired from said access monitoring unit of said management program A exceeds said set upper limit value, and making a request to a controller of said disk storage device to replicate the predetermined volume when determining that the number of accesses per unit time exceeds said upper limit value, so that the controller of said disk storage device replicates the predetermined volume in response to the replication request;

referring to an access destination management table created by an access controller of a management program B for said disk storage device for indicating access requested volumes and accessed volumes, such that some of the processing programs additionally accessing the predetermined volume after the replication are forced to access the replicated volume, switching an accessed volume from the predetermined volume to the replicated volume to distribute an access load between the predetermined volume and the replicated volume, and determining, after the switching, whether access distribution is valid to distribute access requests for processing programs, after switching, between the predetermined volume and the replicated volume; and setting N and T for calculating a predicted number of accesses per unit time in T seconds from N data acquired for the number of accesses per unit time in addition to the upper limit value for the number of accesses to the predetermined volume per unit time, to allow said processing program on said first computer to create an upper limit value management table for indicating the upper limit value, the number of data N, and a time period T to a predicted time on a volume-by-volume basis, wherein said processing program on said first computer calculates the predicted number of accesses per unit time in T seconds from a data acquisition time from said set N data, and determines whether or not said calculated number of accesses per unit time exceeds said set upper limit value to make said determination as to whether or not said upper limit value is exceeded.

2. A disk access control method for use in a data processing system comprising a disk storage device having a volume replication function, a first computer for executing a processing program for accessing said disk storage device, and a management computer for managing said disk storage device for controlling accesses made by a plurality of service programs in said processing program on said first computer to a predetermined volume in said disk storage device, said method comprising the steps of:

setting an upper limit value for a number of accesses to the predetermined volume per unit time to allow said processing program on said first computer to create an upper limit value management table indicating an upper limit value for the number of accesses to each volume per unit time;

acquiring the number of accesses to the predetermined volume to be accessed per unit time from an access monitoring unit of a management program A on said first computer to allow said processing program on said first computer to monitor the number of accesses to the predetermined volume per unit time;

determining whether or not the number of accesses per unit time acquired from said access monitoring unit of said management program A exceeds said set upper limit value, and making a request to a controller of said disk storage device to replicate the predetermined volume when determining that the number of accesses per unit time exceeds said upper limit value, so that the controller of said disk storage device replicates the predetermined volume in response to the replication request; and referring to an access destination management table created by an access controller of a management program B for said disk storage device for indicating access requested volumes and accessed volumes, such that some of the processing programs additionally accessing the predetermined volume after the replication are forced to access the replicated volume, switching an accessed volume from the predetermined volume to the replicated volume to distribute an access load between the predetermined volume and the replicated volume, and determining, after the switching, whether access distribution is valid to distribute access requests for processing programs, after switching, between the predetermined volume and the replicated volume, wherein:

said upper limit value management table is created by said controller of said disk storage device;

the number of accesses to the predetermined volume in said disk storage device per unit time is monitored by acquiring data on the number of accesses per unit time from an access monitoring unit in said controller of said disk storage device; and said controller of said disk storage device determines whether or not said number of accesses per unit time exceeds the upper limit value, and makes the request for replicating the predetermined volume; and setting N and T for calculating a predicted number of times of accesses per unit time in T seconds from N data acquired for the number of accesses per unit time in addition to the upper limit value for the number of accesses to the predetermined volume per unit time, to allow said controller of said disk storage device to create an upper limit value management table for indicating the upper limit value, the number of data N, and a time period T to a predicted time on a volume-by-volume basis, wherein said controller of said disk storage device calculates the predicted number of accesses per unit time in the time period T from the data acquisition time from said set N data, and determines whether or not said calculated number of accesses per unit time exceeds said set upper limit value to make said determination as to whether or not said upper limit value is exceeded.

3. A disk access control method for use in a data processing system comprising a disk storage device having a volume replication function, a first computer for executing a processing program for accessing said disk storage device, and a management computer for managing said disk storage device for controlling accesses made by a plurality of service programs in said processing program on said first computer to a predetermined volume in said disk storage device, said method comprising the steps of:

setting an upper limit value for a number of accesses to the predetermined volume per unit time to allow said processing program on said first computer to create an upper limit value management table indicating an upper limit value for the number of accesses to each volume per unit time;

acquiring the number of accesses to the predetermined volume to be accessed per unit time from an access monitoring unit of a management program A on said first computer to allow said processing program on said first computer to monitor the number of accesses to the predetermined volume per unit time;

determining whether or not the number of accesses per unit time acquired from said access monitoring unit of said management program A exceeds said set upper limit value, and making a request to a controller of said disk storage device to replicate the predetermined volume when determining that the number of accesses per unit time exceeds said upper limit value, so that the controller of said disk storage device replicates the predetermined volume in response to the replication request; and referring to an access destination management table created by an access controller of a management program B for said disk storage device for indicating access requested volumes and accessed volumes, such that some of the processing programs additionally accessing the predetermined volume after the replication are forced to access the replicated volume, switching an accessed volume from the predetermined volume to the replicated volume to distribute an access load between the predetermined volume and the replicated volume, and determining, after the switching, whether access distribution is valid to distribute access requests for processing programs, after switching, between the predetermined volume and the replicated volume;

wherein:

the number of accesses to the predetermined volume in said disk storage device per unit time is monitored by acquiring data on the number of accesses per unit time from an access monitoring unit in said management program B for said disk storage device; and said management program B for said disk storage device determines whether or not the number of accesses per unit time exceeds said upper limit value, and makes said request for replicating the predetermined volume; and setting N and T for calculating a predicted number of accesses per unit time in the time period T from N data acquired for the number of times of accesses per unit time in addition to the upper limit value for the number of accesses to the predetermined volume per unit time, to allow said management program B on said management computer associated with said storage device to create an upper limit value management table for indicating the upper limit value, the number of data N, and a time period T to a predicted time on a volume-by-volume basis, wherein said management program B on said management computer associated with said storage device calculates the predicted number of times of accesses per unit time in T seconds from a data acquisition time from said set N data, and determines whether or not said calculated number of times per unit time exceeds said set upper limit value to make said determination as to whether or not said upper limit value is exceeded.

* * * * *